United States Patent
McKay et al.

(10) Patent No.: US 8,973,716 B2
(45) Date of Patent: Mar. 10, 2015

(54) BRAKE MECHANISM FOR A NON-MOTORIZED WHEELED VEHICLE

(75) Inventors: John C. McKay, Placentia, CA (US); Stephen E. Hannah, Placentia, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 602 days.

(21) Appl. No.: 12/911,647

(22) Filed: Oct. 25, 2010

(65) Prior Publication Data

US 2011/0036671 A1 Feb. 17, 2011

Related U.S. Application Data

(63) Continuation of application No. PCT/US2009/042740, filed on May 4, 2009.

(60) Provisional application No. 61/050,567, filed on May 5, 2008.

(51) Int. Cl.
  *F16D 65/16* (2006.01)
  *B62B 5/04* (2006.01)
  *B60T 1/04* (2006.01)

(52) U.S. Cl.
  CPC ... *B62B 5/04* (2013.01); *B60T 1/04* (2013.01); *B62B 5/0461* (2013.01); *B62B 5/048* (2013.01)
  USPC .......................................... 188/1.12; 188/31

(58) Field of Classification Search
  USPC ........................................... 188/1.12, 31, 20
  See application file for complete search history.

(56) References Cited

U.S. PATENT DOCUMENTS

| | | | | |
|---|---|---|---|---|
| 1,190,811 | A | * | 7/1916 | Swoyer et al. ................. 188/31 |
| 1,449,064 | A | | 7/1921 | Settles |
| 1,863,349 | A | * | 6/1932 | Noelting et al. ............... 188/69 |
| 2,009,862 | A | * | 7/1935 | Spell ............................. 188/31 |
| 2,437,108 | A | * | 3/1948 | Madison ......................... 188/5 |

(Continued)

FOREIGN PATENT DOCUMENTS

| | | |
|---|---|---|
| FR | 2584789 | 1/1987 |
| GB | 2379804 A | 3/2003 |

(Continued)

OTHER PUBLICATIONS

Press release titled "Gatekeeper Systems announces new product launch," dated Feb. 18, 2005.

(Continued)

*Primary Examiner* — Bradley King
(74) *Attorney, Agent, or Firm* — Knobbe, Martens, Olson & Bear, LLP

(57) ABSTRACT

Brake mechanisms for a wheel of non-motorized wheeled vehicle such as, e.g., a shopping cart, are described. In various embodiments, the brake mechanism can provide a variable amount of braking force or torque between zero and an amount sufficient to lock the wheel. In some embodiments, the brake mechanism includes a brake plate that is movable toward and away from a surface of the wheel hub along a direction parallel to the rotation axis of the wheel. The brake plate is configured not to rotate when the wheel and hub are rotating. Frictional engagement between the brake plate and the surface of the wheel hub provides the braking force. The brake plate and/or the surface of the wheel hub can include engagement features such as, e.g., protrusions and slots. In some embodiments, the brake mechanism fits entirely within the wheel.

33 Claims, 16 Drawing Sheets

(56) References Cited

U.S. PATENT DOCUMENTS

| | | | | |
|---|---|---|---|---|
| 2,964,140 | A | 12/1960 | Berezny | |
| 3,031,037 | A | 4/1962 | Stollman | |
| 3,031,038 | A | 4/1962 | Chait | |
| 3,068,963 | A * | 12/1962 | Smith et al. | 188/69 |
| 3,088,340 | A * | 5/1963 | Shotey | 74/813 R |
| 3,117,655 | A | 1/1964 | Skupas et al. | |
| 3,356,185 | A | 12/1967 | Isaacks | |
| 3,495,688 | A | 2/1970 | Isaacks | |
| 3,590,962 | A | 7/1971 | Parker et al. | |
| 3,809,191 | A | 5/1974 | Woodward | |
| 4,037,882 | A | 7/1977 | Taylor | |
| 4,242,668 | A | 12/1980 | Herzog | |
| 4,263,996 | A | 4/1981 | Putney | |
| 4,577,880 | A | 3/1986 | Bianco | |
| 4,591,175 | A | 5/1986 | Upton et al. | |
| 4,629,036 | A | 12/1986 | Choy | |
| 4,742,857 | A | 5/1988 | Gandhi | |
| 4,772,880 | A | 9/1988 | Goldstein et al. | |
| 4,868,544 | A | 9/1989 | Havens | |
| 5,000,297 | A | 3/1991 | Shaw et al. | |
| 5,040,641 | A | 8/1991 | Phillips et al. | |
| 5,053,692 | A | 10/1991 | Craddock | |
| 5,064,012 | A * | 11/1991 | Losego | 180/19.1 |
| 5,072,956 | A | 12/1991 | Tannehill | |
| 5,194,844 | A | 3/1993 | Zelda | |
| 5,315,290 | A | 5/1994 | Moreno | |
| 5,357,182 | A | 10/1994 | Wolfe et al. | |
| 5,377,513 | A | 1/1995 | Miyamoto et al. | |
| 5,394,962 | A | 3/1995 | Gray | |
| 5,402,106 | A | 3/1995 | DiPaolo et al. | |
| 5,426,561 | A | 6/1995 | Yen et al. | |
| 5,432,412 | A | 7/1995 | Harris et al. | |
| 5,441,137 | A | 8/1995 | Organek et al. | |
| 5,505,285 | A | 4/1996 | Organek | |
| 5,572,108 | A | 11/1996 | Windes | |
| 5,576,691 | A | 11/1996 | Coakley et al. | |
| 5,598,144 | A | 1/1997 | Lace | |
| 5,607,030 | A | 3/1997 | Swift et al. | |
| 5,630,597 | A * | 5/1997 | Klukos | 280/11.217 |
| 5,651,437 | A | 7/1997 | Organek et al. | |
| 5,713,446 | A | 2/1998 | Organek et al. | |
| 5,806,862 | A | 9/1998 | Merryman et al. | |
| 5,821,856 | A | 10/1998 | Lace | |
| 5,823,302 | A | 10/1998 | Schweninger | |
| 5,831,530 | A | 11/1998 | Lace et al. | |
| 6,008,546 | A | 12/1999 | Sage | |
| 6,100,615 | A | 8/2000 | Birkestrand | |
| 6,125,972 | A | 10/2000 | French et al. | |
| 6,127,927 | A | 10/2000 | Durban et al. | |
| 6,155,385 | A | 12/2000 | Basnett | |
| 6,161,849 | A | 12/2000 | Schweninger | |
| 6,167,997 | B1 * | 1/2001 | Keeney | 192/40 |
| 6,173,817 | B1 | 1/2001 | Gray | |
| 6,187,471 | B1 | 2/2001 | McDermott et al. | |
| 6,217,398 | B1 | 4/2001 | Davis | |
| 6,232,884 | B1 | 5/2001 | Gabbard | |
| 6,341,671 | B1 * | 1/2002 | Ebersole | 188/2 F |
| 6,353,388 | B1 | 3/2002 | Durban et al. | |
| 6,355,996 | B1 | 3/2002 | Birkestrand | |
| 6,362,728 | B1 | 3/2002 | Lace et al. | |
| 6,374,955 | B1 | 4/2002 | Gray | |
| 6,398,395 | B1 | 6/2002 | Hyun | |
| 6,424,115 | B1 | 7/2002 | Holl | |
| 6,502,669 | B1 | 1/2003 | Harris | |
| 6,597,136 | B2 | 7/2003 | Burton et al. | |
| 6,637,569 | B1 | 10/2003 | Organek et al. | |
| 6,723,277 | B1 | 4/2004 | Kurz et al. | |
| 6,739,675 | B1 | 5/2004 | Scharpf et al. | |
| 6,744,356 | B2 | 6/2004 | Hamilton et al. | |
| 6,774,503 | B1 | 8/2004 | Chen | |
| 6,868,318 | B1 | 3/2005 | Cawthorne et al. | |
| 6,911,908 | B1 | 6/2005 | Beart | |
| 6,928,343 | B2 | 8/2005 | Cato | |
| 6,945,366 | B2 | 9/2005 | Taba | |
| 6,974,399 | B2 | 12/2005 | Lo | |
| 7,061,749 | B2 | 6/2006 | Liu et al. | |
| 7,277,010 | B2 | 10/2007 | Joao | |
| 7,392,872 | B2 | 7/2008 | Chiu et al. | |
| 7,397,373 | B2 | 7/2008 | Hunt | |
| 7,944,368 | B2 | 5/2011 | Carter et al. | |
| 8,046,160 | B2 | 10/2011 | Carter et al. | |
| 8,210,324 | B2 * | 7/2012 | Blanchard | 188/69 |
| 8,463,540 | B2 | 6/2013 | Hannah et al. | |
| 8,674,845 | B2 | 3/2014 | Carter et al. | |
| 2001/0008191 | A1 | 7/2001 | Smith et al. | |
| 2003/0206102 | A1 | 11/2003 | Joao | |
| 2003/0217878 | A1 * | 11/2003 | Etzioni et al. | 180/65.5 |
| 2005/0027443 | A1 | 2/2005 | Cato | |
| 2005/0046127 | A1 * | 3/2005 | Cheng et al. | 280/19 |
| 2005/0155824 | A1 | 7/2005 | Taba | |
| 2005/0279589 | A1 | 12/2005 | Gray | |
| 2006/0244588 | A1 | 11/2006 | Hannah et al. | |
| 2006/0247847 | A1 | 11/2006 | Carter et al. | |
| 2006/0249320 | A1 | 11/2006 | Carter et al. | |
| 2007/0013155 | A1 | 1/2007 | Wieth et al. | |
| 2007/0045018 | A1 | 3/2007 | Carter et al. | |
| 2007/0045019 | A1 | 3/2007 | Carter et al. | |
| 2007/0104981 | A1 | 5/2007 | Lam et al. | |
| 2007/0225879 | A1 | 9/2007 | French et al. | |
| 2008/0066979 | A1 | 3/2008 | Carter | |
| 2009/0231095 | A1 | 9/2009 | Gray | |
| 2012/0217103 | A1 | 8/2012 | Khuu | |

FOREIGN PATENT DOCUMENTS

| | | |
|---|---|---|
| WO | WO 95/20515 | 8/1995 |
| WO | WO 99/03720 | 1/1999 |
| WO | WO 2004/031017 | 4/2004 |
| WO | WO 2005/118992 | 12/2005 |
| WO | WO 2007/110571 | 10/2007 |
| WO | WO 2007/110572 | 10/2007 |
| WO | WO 2007/110573 | 10/2007 |
| WO | WO 2008/007050 | 1/2008 |
| WO | WO 2009/137422 | 11/2009 |
| WO | WO 2010/036952 | 4/2010 |

OTHER PUBLICATIONS

2004 Sales presentation of Gatekeeper Systems, Inc. for its Purchek™ push-out prevention system.

Press release dated Apr. 28, 2005, titled "Purchek™—a Trolley-based Anti-theft Solution from Gatekeeper Garners Huge Attention at the 2005 Retail Middle East Exhibition."

International Search Report and Written Opinion for PCT Application No. PCT/US2009/042740 mailed on Jun. 25, 2009.

International Preliminary Report on Patentability for International Application No. PCT/US2009/042740, dated Nov. 9, 2010, in 7 pages.

\* cited by examiner

BRAKE MECHANISM FOR A NON-MOTORIZED WHEELED VEHICLE

CROSS-REFERENCE TO RELATED APPLICATIONS

The present application claims the benefit under 35 U.S.C. §120 and U.S.C. §365(c) as a continuation of International Application No. PCT/US2009/042740, designating the United States, with an international filing date of May 4, 2009, entitled "BRAKE MECHANISM FOR A NON-MOTORIZED WHEELED VEHICLE," which claims the benefit under 35 U.S.C. §119(e) of U.S. Provisional Patent Application No. 61/050,567, filed May 5, 2008, entitled "BALL-RAMP BRAKE MECHANISM;" the entire disclosures of each of the aforementioned applications are hereby expressly incorporated by reference herein in their entirety.

BACKGROUND

1. Field

This application relates to a brake mechanism for a wheel of a non-motorized wheeled vehicle including, but not limited to, a shopping cart.

2. Description of Related Art

Non-motorized wheeled vehicles are used in a wide range of applications. In some of these applications, it may be desirable to provide a brake mechanism to inhibit motion of the vehicle. In certain cases, the brake mechanism can be disposed in one or more wheels of the vehicle. For example, in one non-limiting example application for non-motorized carts, a shopping cart containment system may be used to deter theft of shopping carts from a retail location such as, e.g., a supermarket. In one such example containment system, a wire may be embedded in the pavement of a store parking lot to define an outer boundary of an area in which shopping cart use is permitted. A signal generator is used to transmit an electromagnetic signal through the wire. One or more wheels of the shopping carts may be configured with a brake mechanism. When a shopping cart is moved over the boundary wire, a sensor in or near the shopping cart wheel detects the electromagnetic signal in the wire, and in response, the brake mechanism is actuated, thereby inhibiting movement of the shopping cart. For example, the actuated brake mechanism may lock the wheel to substantially prevent rotation of the wheel. This example system advantageously deters theft (and/or movement of carts into undesirable and/or unsafe areas), because a user will have to drag (or carry) the cart once one or more wheel brakes have been actuated. In some implementations, to unbrake the wheel, an authorized attendant may use a handheld remote control to send an unlock signal to the brake mechanism, thereby permitting the cart to be rolled back to a desired location at the retail location.

SUMMARY

Embodiments of a brake mechanism are disclosed herein that advantageously can be used with a wheel of a non-motorized wheeled vehicle including, but not limited to, a shopping cart.

An embodiment of a brake assembly for a wheel of a non-motorized wheeled vehicle is described. The brake assembly comprises a wheel hub that comprises a side wall. The wheel hub has a hub axis that is substantially perpendicular to the side wall, and the side wall comprises a plurality of first engagement features that are spaced transversely from the hub axis. The brake assembly also comprises a brake plate having a plate axis that is substantially perpendicular to the brake plate. The brake plate comprises a plurality of second engagement features that are spaced transversely from the plate axis. The brake assembly also comprises an axle that couples the brake plate to the wheel hub such that the plate axis is substantially collinear with the hub axis. The axle can be configured to allow relative rotation between the wheel hub and the brake plate, and the brake plate can be configured to be axially movable relative to the axle between a first position and a second position. The first position is spaced a first distance along the hub axis from the side wall, and the second position is spaced a second distance along the hub axis from the side wall. The second distance is less than the first distance. The brake assembly also comprises a drive mechanism configured to move the brake plate between the first position and the second position. The plurality of second engagement features are configured to engage the plurality of first engagement features when the brake plate is in the second position but not when the brake plate is in the first position. The brake assembly can be configured for use with a standard-sized shopping cart wheel. In some embodiments, the brake assembly is disposed within the wheel, for example, within a hub of the wheel.

An embodiment of a method of inhibiting movement of a non-motorized wheeled vehicle is provided. The method comprises providing a wheel that includes an embodiment of the brake assembly described herein. The method includes moving the brake plate of the brake assembly from the first position to the second position. The method can also include moving the moving the brake plate of the brake assembly from the second position to the first position. The method can further comprise receiving an electromagnetic signal and moving the brake plate in response to the received electromagnetic signal.

An embodiment of a wheel for a human-propelled wheeled cart is described. The wheel is rotatable about a wheel rotation axis. The wheel comprises a brake configured to inhibit rotation of the wheel about the wheel rotation axis. The brake may be disposed in the wheel of the human-propelled wheeled cart in some embodiments. The brake comprises an engagement surface configured to rotate about the wheel rotation axis when the wheel rotates and a brake surface configured not to rotate about the wheel rotation axis when the wheel rotates. The brake surface is movable toward and away from the engagement surface in a direction substantially parallel to the wheel rotation axis. The brake also comprises a brake actuator configured to move the brake surface between a first position and a second position relative to the engagement surface along the direction. When the brake surface is in the first position, the engagement surface and the brake surface are not in contact. When the brake surface is in the second position, at least a portion of the engagement surface and the brake surface are in contact, thereby inhibiting rotation of the wheel.

Embodiments of the wheel can be used in implementations in which the human-propelled wheeled cart comprises a shopping cart. Embodiments of the wheel can have a diameter in a range from about 3 inches to about 10 inches. Embodiments of the wheel can have a diameter in a range from about 8 cm to about 25 cm. Embodiments of the wheel can have a diameter of about 5 inches or about 13 cm. A human-propelled wheeled vehicle can use one or more embodiments of the wheel. The human-propelled wheeled vehicle can be a shopping cart, a luggage cart, or a medical device cart.

In an embodiment of a cart confinement system for a confinement area, the cart confinement system comprises a boundary marking system configured to provide an electromagnetic signal that is detectable near a boundary of the confinement area. The system also comprises a non-motorized vehicle having at least one wheel. The wheel includes an embodiment of the brake mechanism described herein. The wheel also includes an electromagnetic sensor configured to detect the electromagnetic signal and a brake controller configured to move the brake plate of the brake mechanism from a first position in which the wheel is unbraked to a second position in which the wheel is braked, thereby inhibiting rotation of the wheel and movement of the vehicle. The controller is configured to move the brake plate in response to the detection of the electromagnetic signal.

DETAILED DESCRIPTION OF PREFERRED EMBODIMENTS

Various non-limiting example embodiments of brake mechanisms will be described with reference to the drawings. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Embodiments of the brake mechanisms described herein advantageously may be used with wheels of non-motorized carts (e.g., shopping carts) to be used with a cart containment system including, but not limited to, the example systems shown and described in U.S. Patent Application Publication 2006/0244588, entitled "Two-Way Communication System for Tracking Locations and Statuses of Wheeled Vehicles," published Nov. 2, 2006 (hereinafter "the Two-Way Communication Publication"), the entire disclosure of which is hereby expressly incorporated by reference herein and made part of this specification. Such example implementations are not intended to suggest that the disclosed brake mechanisms are limited to shopping carts or limited for use with cart containment systems. Embodiments of the disclosed brake mechanism may be used with a wide range of non-motorized wheeled vehicles, non-self-powered wheeled carts, and/or human-propelled wheeled vehicles including, but not limited to, shopping carts, warehouse carts, industrial carts, luggage carts, baggage carts, medical equipment carts, utility carts, wheelchairs, wheeled stretchers, strollers, beds, and so forth. Embodiments of the brake mechanism may be used with a cart containment system, a cart location and tracking system, an inventory system for wheeled carts and vehicles, and so forth. Embodiments of the brake mechanism can be used to brake a non-motorized wheeled vehicle to keep the vehicle in a preferred location or position. For example, a medical device may be wheeled into a desired position near a patient and then the brake mechanism can be actuated to inhibit motion of one or more wheels so that the medical device is held in place near the patient.

Example Brake Plate Assembly

Figure 1:
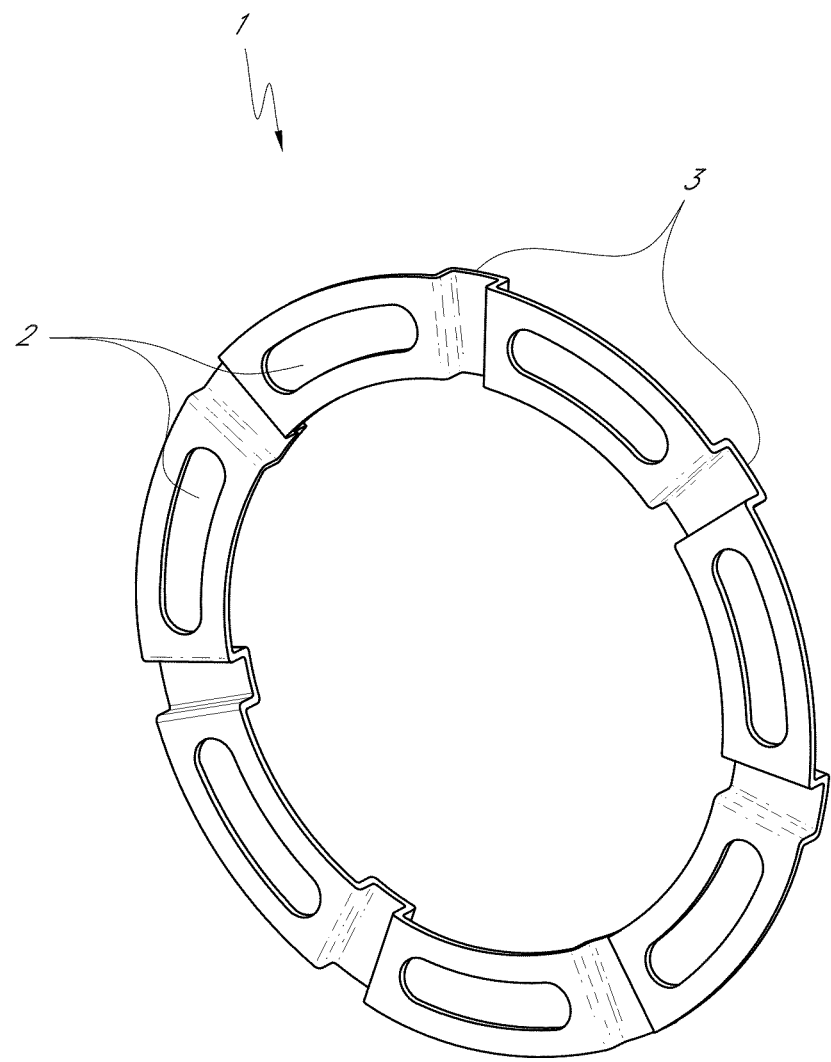
FIG. 1 is a perspective view that schematically illustrates an embodiment of an insert for a brake plate assembly.

FIG. 1 is a perspective view that schematically illustrates an embodiment of an insert 1 for a brake plate assembly. In one embodiment, the insert 1 is a generally circular annulus comprising a series of circumferentially disposed slots 2. The shape, width, and/or length of the slots, 2, may different for different slots. In the illustrated embodiment, the slots 2 extend through the thickness of the insert 1. In this embodiment, each of the seven slots 2 has substantially the same arcuate shape having rounded ends. Other embodiments may have a different number of slots 2, which may have different shapes, widths, and/or lengths. For example, in other embodiments, 1, 2, 3, 4, 5, 6, 8, 10, 15, or more slots may be used. In various embodiments, shapes of the slots 2 may include, for example, circles, ellipses, ovals, arcs, rectangles, polygons, and/or other shapes. The slots 2 may extend only partway through the insert 1 and may form grooves, depressions, and so forth. The insert 1 may be formed from a substantially rigid material including, for example, metal, plastic, composite, etc. In certain embodiments, the insert 1 is formed from stamped stainless steel.

In the illustrated embodiment, between adjacent slots 2 is a corresponding depression, 3, having a width and a depth. In various embodiments, the depressions 3 provide a way of integrating the insert 1 with a structural disc 4 (described below) and/or provide a desired degree of flexibility in the radial structure of the brake plate assembly. In other embodiments, a different number of depressions 3 may be used. For example, in one embodiment, a depression 3 is formed between every other pair of adjacent slots 2. In other embodiments, the depressions 3 may have different shapes, widths, and/or depths.

Figure 2:
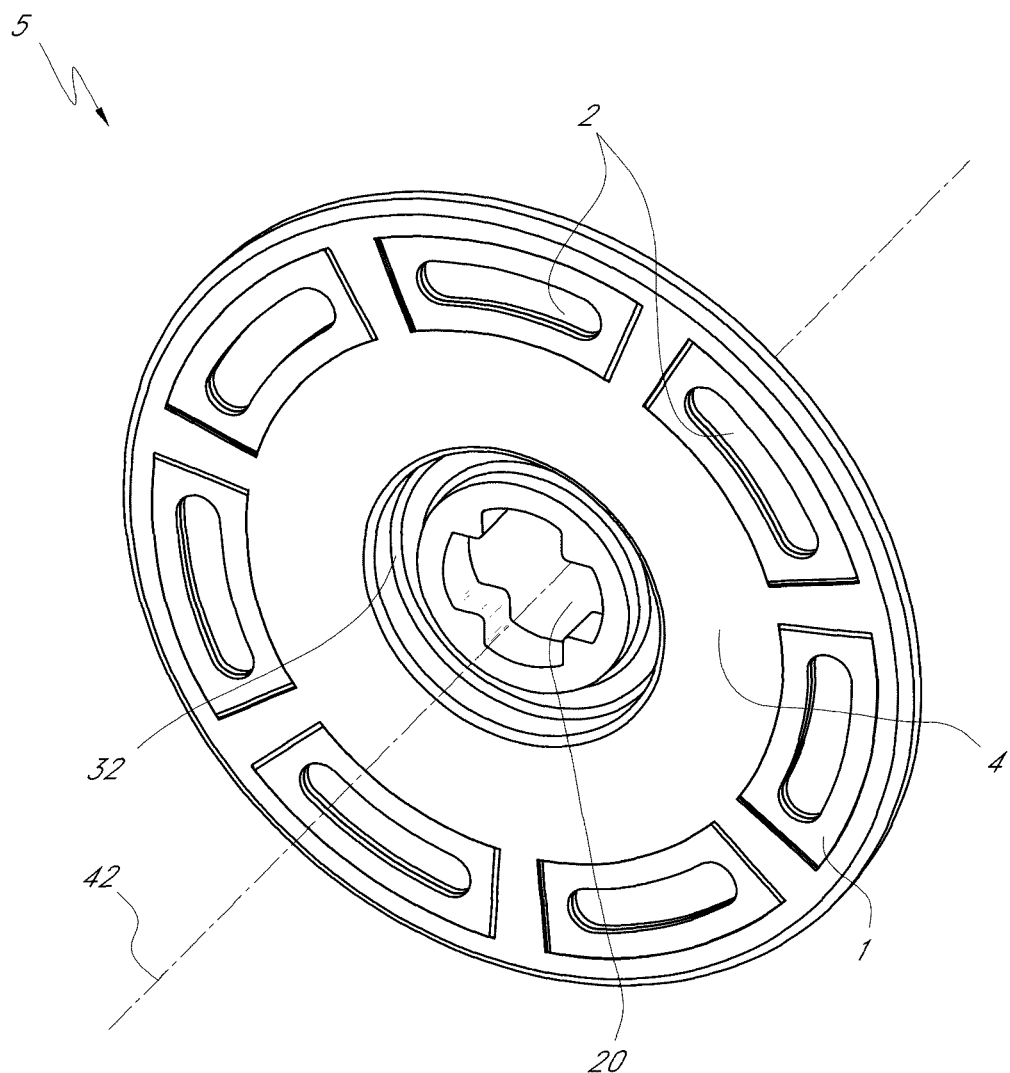
FIG. 2 is a perspective view that schematically illustrates an embodiment of a brake plate assembly.

FIG. 2 is a perspective view that schematically illustrates an embodiment of a brake plate assembly 5. In one embodiment, the brake plate assembly 5 may be formed by placing the insert 1 in a cavity of an injection mold configured to form the geometry of a structural disc 4. The insert 1 may be held in place by features in the mold cavity corresponding to the slots 2. When the molding cycle is complete, the insert 1 is held in place by the plastic resin comprising the structural disc 4, which has flowed between the inside surface of each of the depressions 3 and the surfaces of the mold cavity (see, e.g., FIG. 3). An advantage of forming the brake plate assembly 5 via injection molding is that the insert 1 and the structural disc 4 are securely joined together. The embodiment of the brake plate assembly 5 therefore provides a bi-material composite structure. The materials in the composite structure can be selected so that the brake plate assembly 5 has desirable properties such as, e.g., low weight, strength (under compression and/or tension), durability, etc. In other embodiments, the brake plate assembly 5 may not be formed by injection molding. For example, the structural disc 4 may be formed of a rigid material such as a metal, plastic, and/or composite and the insert 1 may be attached to the disc 4 via welding, adhesives, and/or fasteners (e.g., rivets, clips, bolts, staples, etc.). In various embodiments, the structural disc 4 may comprise a polymer material such as, for example, nylon (e.g., nylon 6 or nylon 6,6), polyoxymethylene (POM, commonly available as DELRIN® from E.I. du Pont de Nemours and Company, Wilmington, Del.) or combinations or compounds thereof (e.g., glass-filled nylon). In some embodiments, the brake plate assembly 5 is formed as a unitary structure.

The brake plate assembly 5 illustrated in FIG. 2 also includes a central opening 20 to permit passage of a wheel axle component 16 (see, e.g., FIG. 10) along a plate axis 42 that is substantially perpendicular to the brake plate assembly 5. In the illustrated embodiment, the central opening 20 is cross-shaped, but may have a different shape in other embodiments. The brake plate assembly 5 also includes an annular groove 32 configured to engage a raised annular ridge 26 in a wheel hub 10 (described below with reference to FIG. 5). In other embodiments, the wheel hub 10 comprises the annular groove and the brake plate assembly 5 comprises the raised annular ridge.

Figure 4:
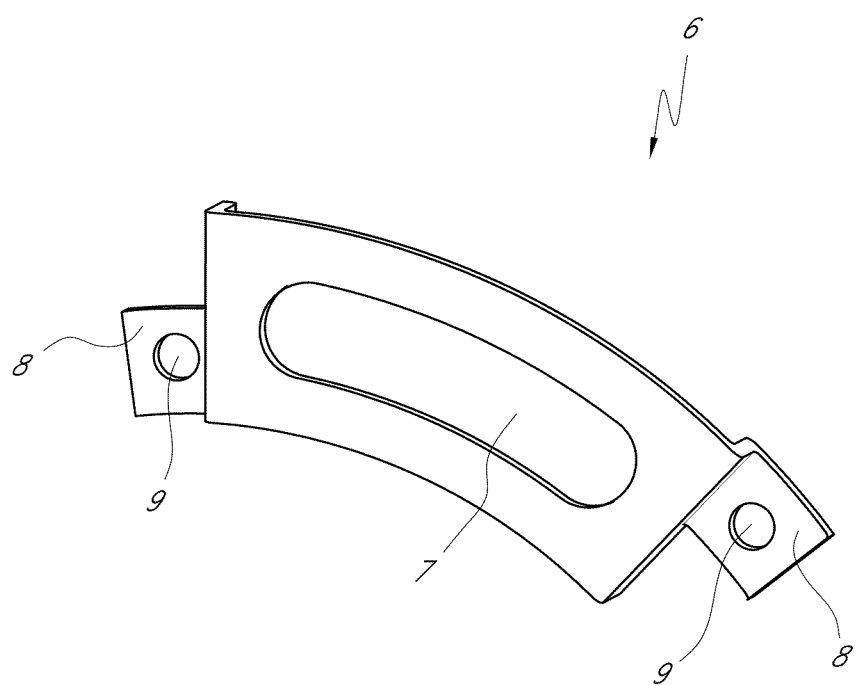
FIG. 4 is a perspective view that schematically illustrates another embodiment of an insert.

In another embodiment schematically illustrated in FIG. 4, the insert 1 comprises a plurality of individually formed segments 6. The segments 6 may be arcuate-shaped (e.g., substantially as shown in FIG. 4) or have other shapes (e.g., rectangles). The insert 1 may comprise 2, 3, 4, 5, 6, 7, 8, 10, 15 or more segments. Each segment 6 may include one or more slots 7 having a shape, width, and length. For example, the shape may be arcuate with rounded ends (see, e.g., FIG. 4). The segments 6 may be joined together to form a substantially circumferential annulus. For example, in the illustrated embodiment, tabs 8 are disposed at ends of each segment 6. The tabs 8 are arranged to provide mating features corresponding to subsequent adjoining segments 6. In this embodiment, each tab 8 includes a centrally-located hole 9 which may be used to integrate the individual segments with the structural disc, 4, and/or to provide a locating feature to hold the segment 6 in position in the mold cavity during the injection cycle. The segments 6 may be formed from a substantially rigid material including, for example, metal, plastic, composite, etc. In some embodiments, the segments 6 are formed from stamped stainless steel.

In one example method of forming the brake plate assembly 5, the segments 6 are placed in the cavity of the injection mold that forms the geometry of the structural disc 4 and held in place during the injection cycle by features in the mold cavity that correspond to the slots 7 and/or the holes 9. When the injection cycle is complete, the segments 6 are held in place by the plastic resin forming the structural disc, 4, which has flowed between the inside surface of each of the tabs 8 and the surfaces of the mold cavity. In other embodiments, the segments 8 may be attached to the disc 4 via welding, adhesives, and/or fasteners.

Figure 3:
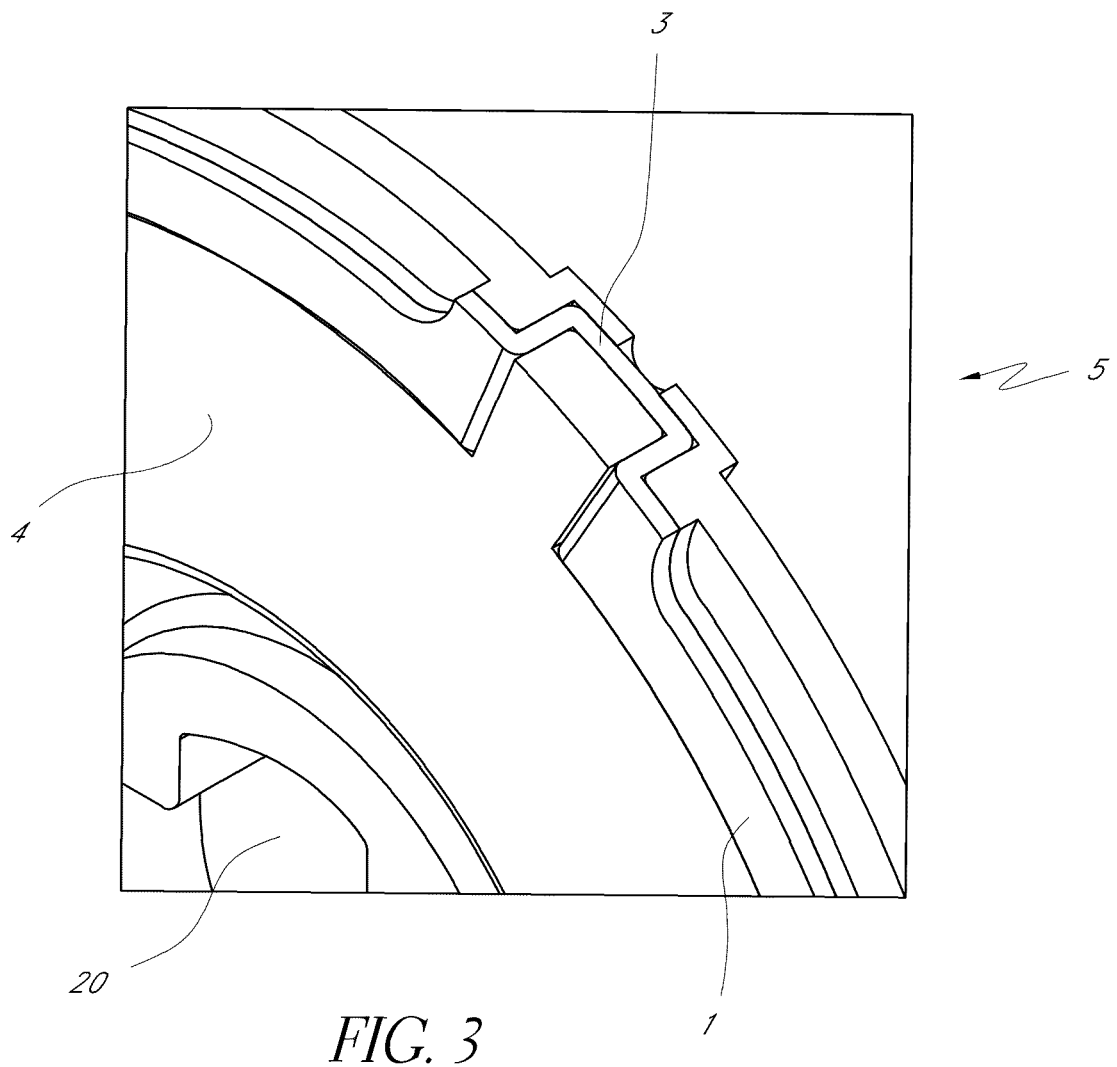
FIG. 3 is a close-up view of a portion of the brake plate assembly shown in FIG. 2.

In other embodiments, the brake plate assembly 5 may be sized and/or shaped differently than shown in FIGS. 2 and 3. For example, in some embodiments, the brake plate assembly 5 comprises a "drum" shape having a face plate and circumferential edges that are configured to fit within a cavity 23 in a wheel hub 10 (described below with reference to FIG. 5). In such embodiments, for example, the slots 2 may be formed on the face plate and/or the circumferential edges. In yet other embodiments, the brake plate assembly 5 may be formed as a unitary structure rather than as a combination of the insert 1 and the structural disc 4.

Example Wheel Hub

Figure 5:
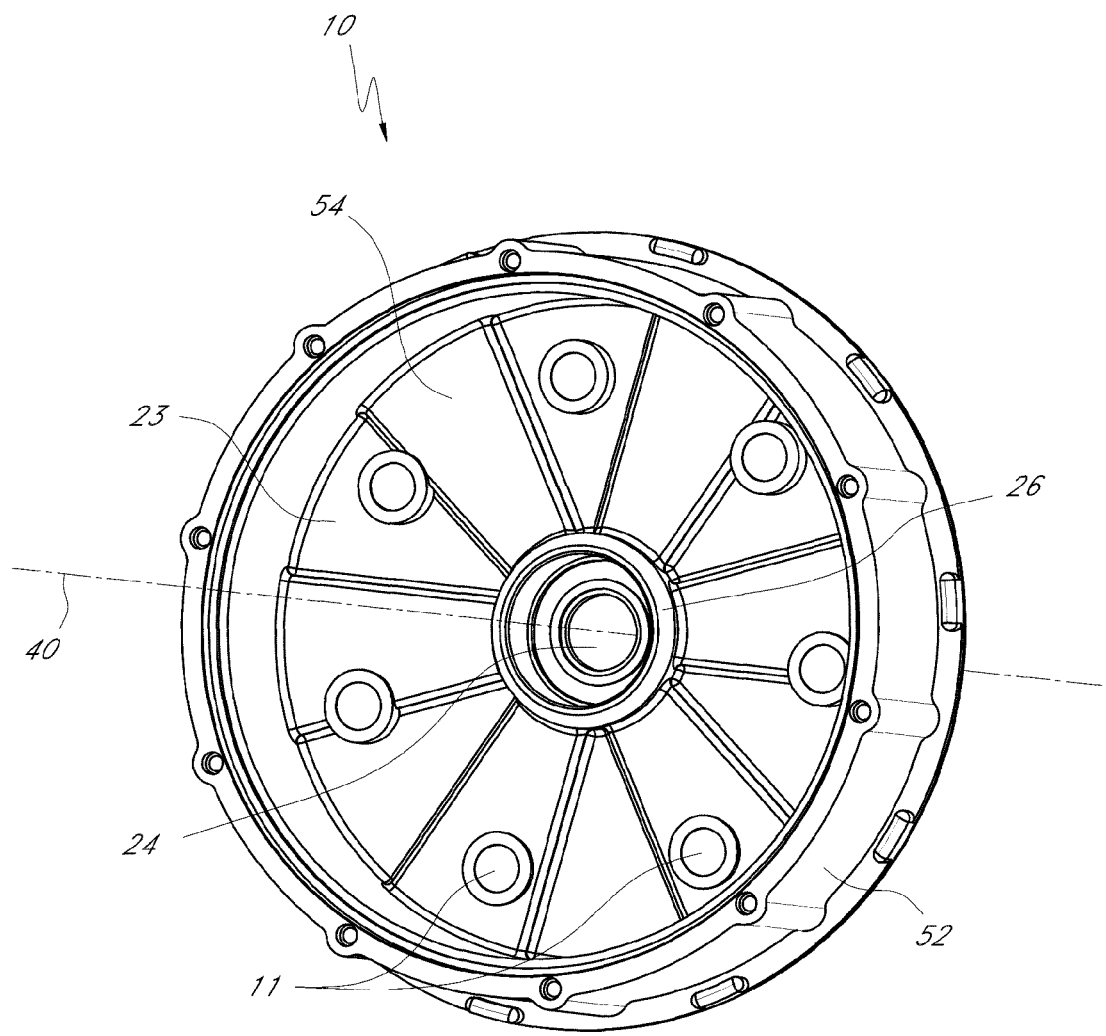
FIG. 5 is a perspective view of an embodiment of a wheel hub comprising a plurality of contact point inserts.

FIG. 5 is a perspective view of an embodiment of a wheel hub 10 comprising a plurality of contact point inserts 11. In one embodiment, the wheel hub 10 is formed from injection molded plastic. In other embodiments, the wheel hub 10 may be formed from substantially rigid materials including, for example, metal, plastic, or composite. In various embodiments, the wheel hub 10 may comprise a polymer material such as, for example, nylon (e.g., nylon 6 or nylon 6,6), or POM (e.g., DELRIN®) or combinations or compounds thereof (e.g., glass-filled nylon). The wheel hub 10 comprises a cavity 23 sized and shaped to receive the brake plate assembly 5. The wheel hub 10 comprises a central opening 24 to permit insertion of an axle component 16 (described below).

The wheel hub 10 may also comprise a raised annular ridge 26 configured to engage the annular groove 32 in the brake plate assembly 5. The annular configuration of the ridge 26 and the groove 32 also permits the wheel hub 10 to rotate relative to the brake plate assembly 5. As discussed further below, during operation of the brake mechanism, the brake plate assembly 5 moves toward and/or away from the wheel hub 10. The engagement of the annular ridge 26 and the annular groove 32 advantageously may improve stability of the brake plate assembly 5 and/or help retain the brake plate assembly 5 in desired positions during movement of the brake plate assembly 5 during operation of the brake mechanism. In other embodiments, the shape, size, and or configuration of the groove 32 and corresponding ridge 26 may be different than shown. For example, in some embodiments, the groove 32 is formed on the wheel hub 10 and the ridge 26 is formed on the brake plate assembly. Also, in some embodiments, the ridge 26 and the groove 32 are not used.

In the embodiment schematically illustrated in FIG. 5, the wheel hub 10 comprises a side wall 54 and a generally cylindrical surface 52 extending substantially perpendicularly from the side wall 54. The cylindrical surface 52 may be adapted to receive a tire of the wheel. The wheel hub 10 has a hub axis 40 that is substantially perpendicular to the side wall 54. In this embodiment, the side wall 54 comprises a plurality of contact point inserts 11 transversely spaced from the hub axis 40. The contact point inserts 11 are configured to engage the slots 2 or 7 to inhibit motion of the wheel as further described below. The contact point inserts 11 may be formed from a substantially rigid and durable material such as, e.g., metal. The contact point inserts 11 may be formed from sintered metal, which advantageously provides a sufficiently hard metal that can be formed in a desired shape without requiring machining. In other embodiments, the inserts 11 are forged and machined. As shown in the embodiment illustrated in FIG. 5, the number of contact point inserts 11 may be equal to the number of slots 2 or 7 in the brake plate assembly 5. In other embodiments, the number of contact point inserts 11 may be less than or greater than the number of slots 2 or 7. As shown in FIG. 5, the contact point inserts 11 can be configured in a pattern corresponding to the positions of the slots 2 or 7 in the insert 1. In the illustrated embodiments, seven contact points 11 are used. A different number and/or arrangement of contact points 11 may be used in other embodiments. For example, 1, 2, 3, 4, 5, 6, 8, 9, 10, or more contact points 11 can be used.

In the embodiment illustrated in FIG. 5, the contact points 11 are arranged in an annulus surrounding the central opening 24. The annulus is spaced radially from the central opening 24 by a transverse distance. The braking torque delivered by the brake mechanism generally increases with increasing transverse distance of the contact points 11 from the central opening 24. In the illustrated embodiment, the contact points 11 are angularly spaced in the annulus, with substantially equal angles between adjacent pairs of points 11. In other embodiments, the contact points 11 may be non-regularly spaced in the annulus. Further, in other embodiments, the contact points 11 may be arranged in multiple annuli having different transverse distances from the central opening 24, or may be arranged at vertices of a polygon, or may be disposed in some other suitable arrangement. In the embodiment shown in FIG. 5, the contact point inserts 11 are disposed on an interior surface of the sidewall 54. In other embodiments, the contact point inserts 11 can be disposed on other portions of the wheel hub 10, on other surfaces that may be attached to the wheel hub 10, and so forth.

Figure 6:
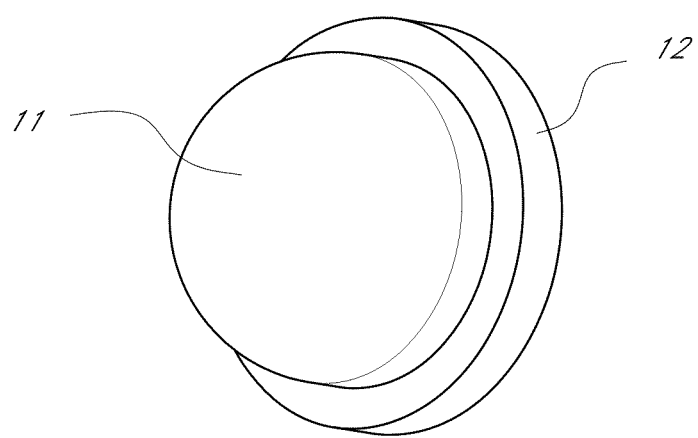
FIG. 6 is a perspective view of an embodiment of a contact point insert usable with embodiments of the wheel hub shown in FIG. 5.

FIG. 6 is a perspective view of an embodiment of a contact point insert 11 usable with embodiments of the wheel hub shown in FIG. 5. In this embodiment, the contact point insert 11 has a substantially hemispherical shape with a tab 12 circumferentially formed at an equator of the hemisphere. Other shapes may be used, and different contact point inserts 11 may have different shapes. For example, the contact point insert 11 may be a raised bump, ridge, or protrusion, having a shape such as rectangular, polygonal, elliptical, oval, or any other shape. In the illustrated embodiment, the contact point inserts 11 are fixed in the wheel hub 10 and do not move or rotate. In other embodiments, the contact point inserts 11 may comprise a ball bearing attached to the wheel hub 10. In various embodiments, the ball bearing may be configured to rotate or not to rotate.

In one example method of forming the wheel hub 10, each of the contact point inserts 11 is placed in the cavity of the injection mold that forms the wheel hub 10 and held in place by features in the mold cavity. When the injection molding cycle is complete, each contact point insert 11 is retained in the desired position by the plastic resin comprising the wheel hub 10, which has flowed around the tab 12 of each contact point insert 11 and the surfaces of the mold cavity (see FIG. 7). The hardened plastic resin firmly holds the contact points 11 in place in the hub 10. In other embodiments, the contact point inserts 11 can be affixed to the wheel hub 10 using adhesives, welds, fasteners, combinations thereof, and so forth.

Figure 8:
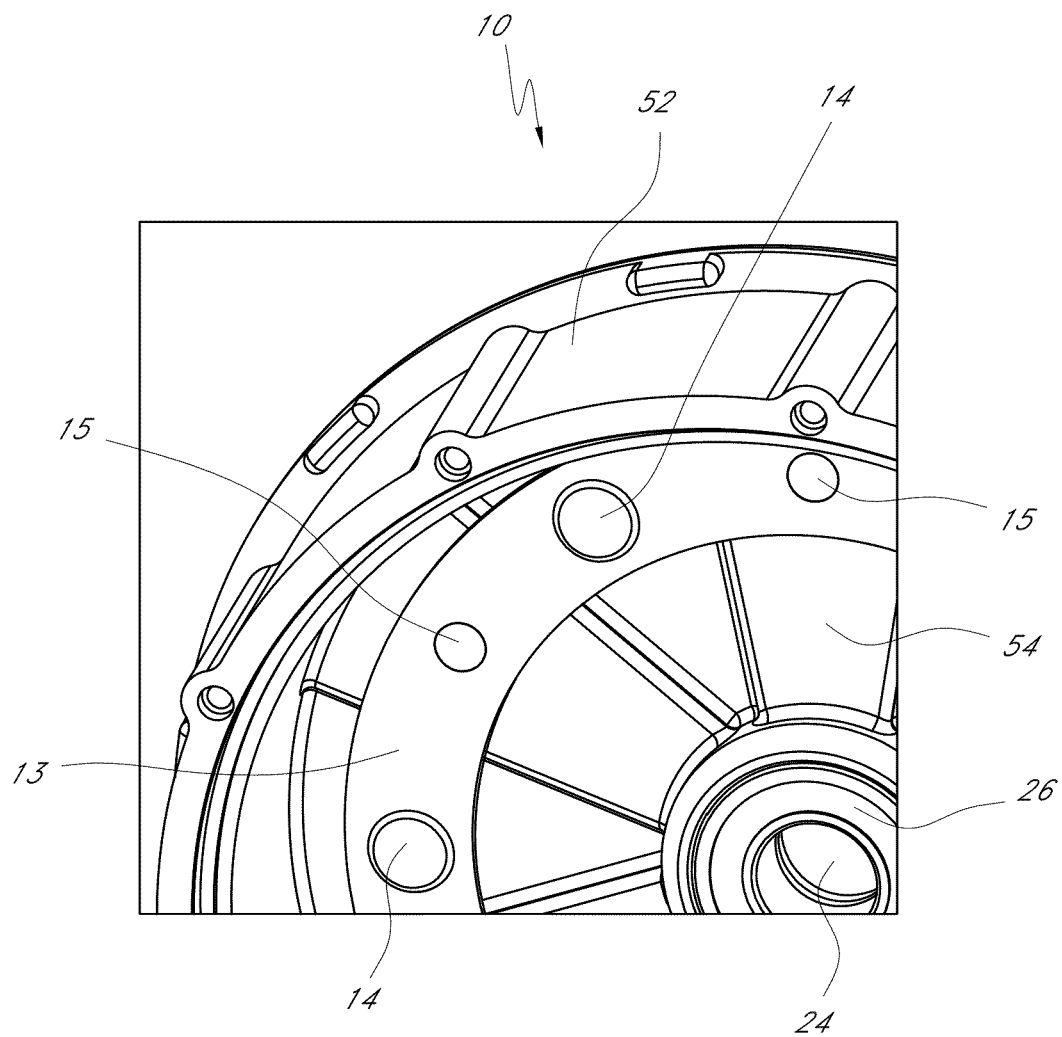
FIG. 8 is a perspective close-up view of another embodiment of a wheel hub.

FIG. 8 is a perspective view of a portion of another embodiment of a wheel hub 10. This embodiment of the wheel hub 10 comprises an injection molded body which holds an annular contact insert 13 comprising a series of protrusions 14. The contact insert 13 may be formed from a rigid, durable material such as, e.g., metal. In other embodiments, the contact insert 13 may be formed from a plurality of individual segments comprising a protrusion. As described above with reference to FIG. 5, the number of protrusions 14 may be equal to the number of slots 2 or 7 in the brake plate assembly 5. The protrusions 14 may be configured in a pattern corresponding to the positions of the slots 2 or 7 in the insert 1.

In one example method of forming the embodiment of the hub 10 shown in FIG. 8, the contact insert 13 is placed in the cavity of the injection mold that forms the geometry of the wheel hub 10 and held in place by features in the mold cavity corresponding to one or more radial holes 15 in the contact insert 13. When the molding cycle is complete, the contact insert 13 is held in position by the hardened plastic resin forming the hub 10, which has flowed between the inside surface of each of the radial holes 15 and the surfaces of the mold cavity. In other methods, the contact insert 13 may be attached to the body of the hub 10 using, e.g., adhesives, welds, and/or fasteners.

In other embodiments, the wheel hub 10 may be formed as a unitary structure rather than a composite structure. Many variations are possible.

Example Wheel and Brake Mechanism

Figure 9A:
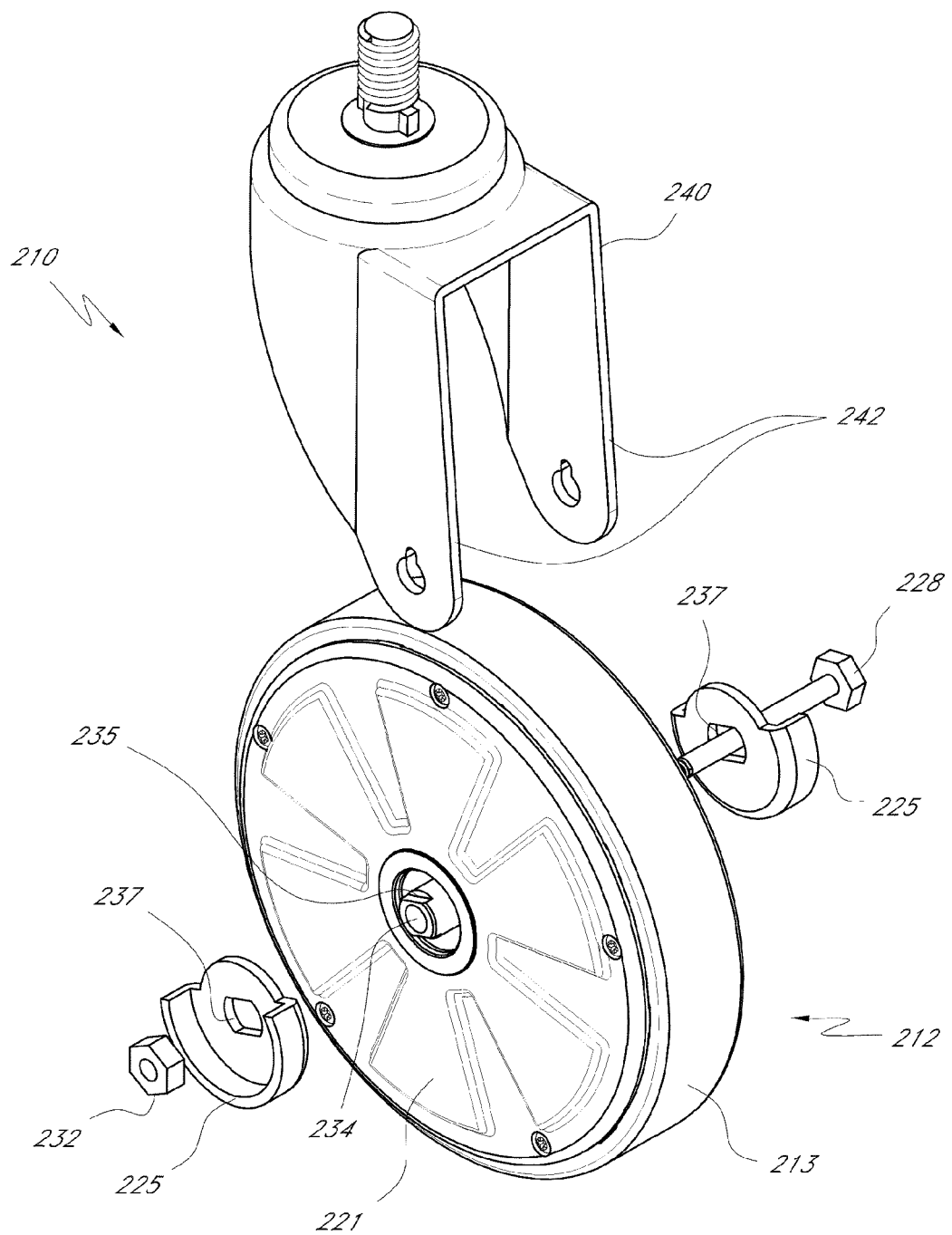
FIG. 9A is an exploded view that shows an embodiment of a wheel assembly comprising a wheel and a caster. The wheel assembly can be attached to a non-motorized wheeled vehicle such as, e.g., a shopping cart.

FIG. 9A is an exploded view that shows an embodiment of a wheel assembly 210 comprising a wheel 212 and a caster 240 (also known as a "fork" or a "yoke"). The wheel assembly 210 is adapted to be attached to a non-motorized wheeled vehicle, such as a cart, by being screwed in to the vehicle's frame. The wheel assembly 210 can be used to replace one (or more) of the wheels on the vehicle. For example, the wheel assembly 210 can replace a standard-sized front (and/or rear) wheel on a shopping cart. In certain embodiments, the wheel 212 has a diameter of about five inches (about 13 cm), although the wheel 212 can be larger or smaller in other embodiments. The wheel 212 includes a tire 213 that is circumferentially disposed about a hub (not shown in FIG. 9A). The hub may be generally similar to embodiments of the wheel hub 10 described herein. The hub rotates with the tire 213. The hub can have a cover 221 that protects components (such as portions of the brake mechanism) disposed within the hub from environmental conditions In addition, the cover 221 prevents internal components from being seen and tampered with by users of the vehicle. The hub (and the cover 221) can be fabricated from rigid, lightweight materials including plastics such as nylon, POM, acrylonitrile butadiene styrene (ABS), etc.

In the embodiment shown in FIG. 9A, the wheel 212 is disposed between end portions 242 of the caster 240. The end portions 242 fit into "U"-shaped retaining clips 225. A bolt 228 passes through the retaining clips 225, the end portions 242, and a hollow axle 234 in the center of the hub. The hollow axle 234 may be generally similar to the axle component 16 described below with reference to FIG. 10. A nut 232 is tightened to secure the wheel 212 to the caster 240. The axle 234 has flat portions 235 that engage shaped holes 237 in the retaining clips 225. The axle 234 is prevented from rotating by the interference fit between the "U"-shaped sides of the retaining clips 225 and the end portions 242 of the caster 240. Internal components disposed within the hub (such as, e.g., the brake plate assembly 5) can be prevented from rotating by attaching them to the non-rotating axle 234.

Figure 9B:
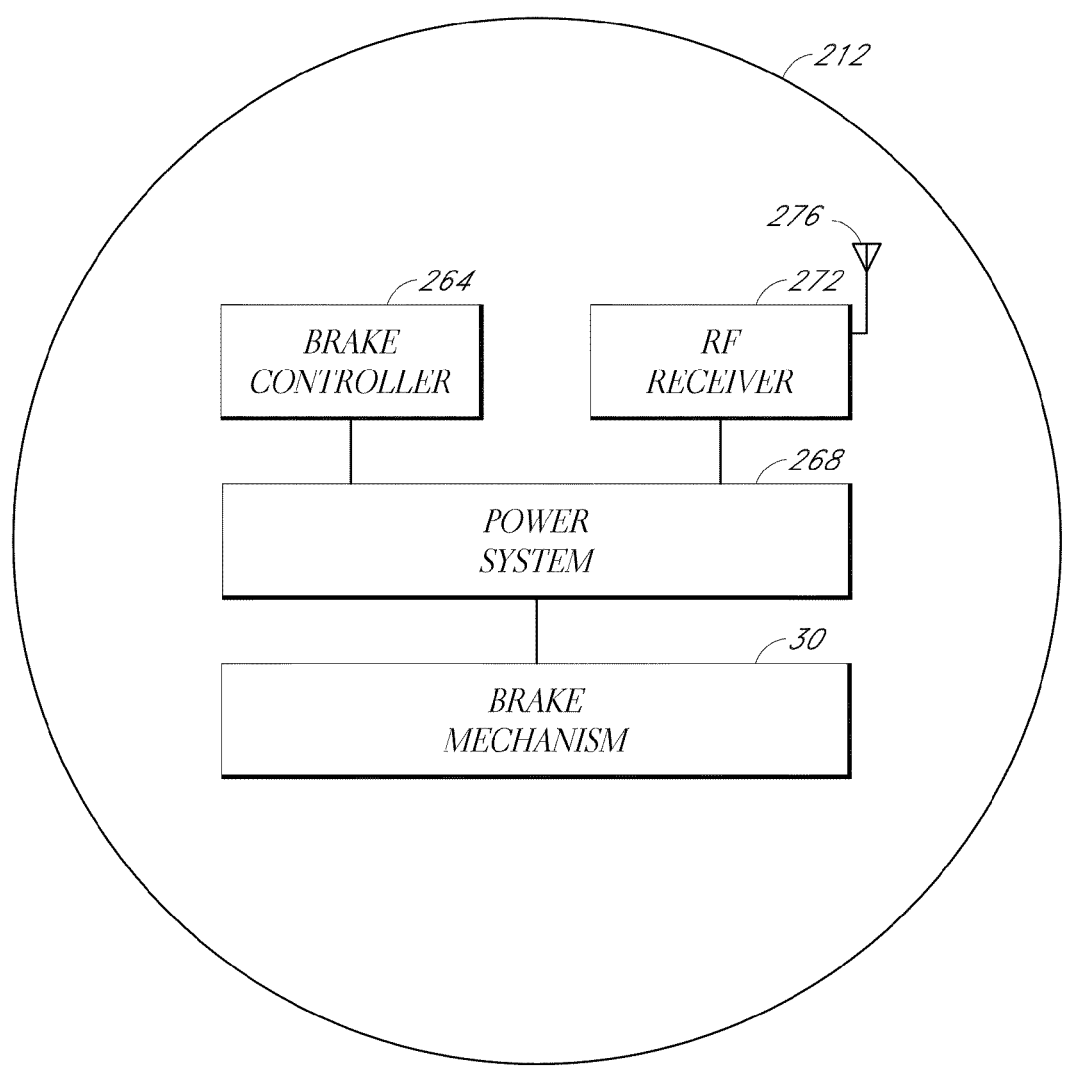
FIG. 9B is a block diagram schematically illustrating examples of components that may be included in embodiments of a wheel for a non-motorized wheeled vehicle.
Figure 10A:
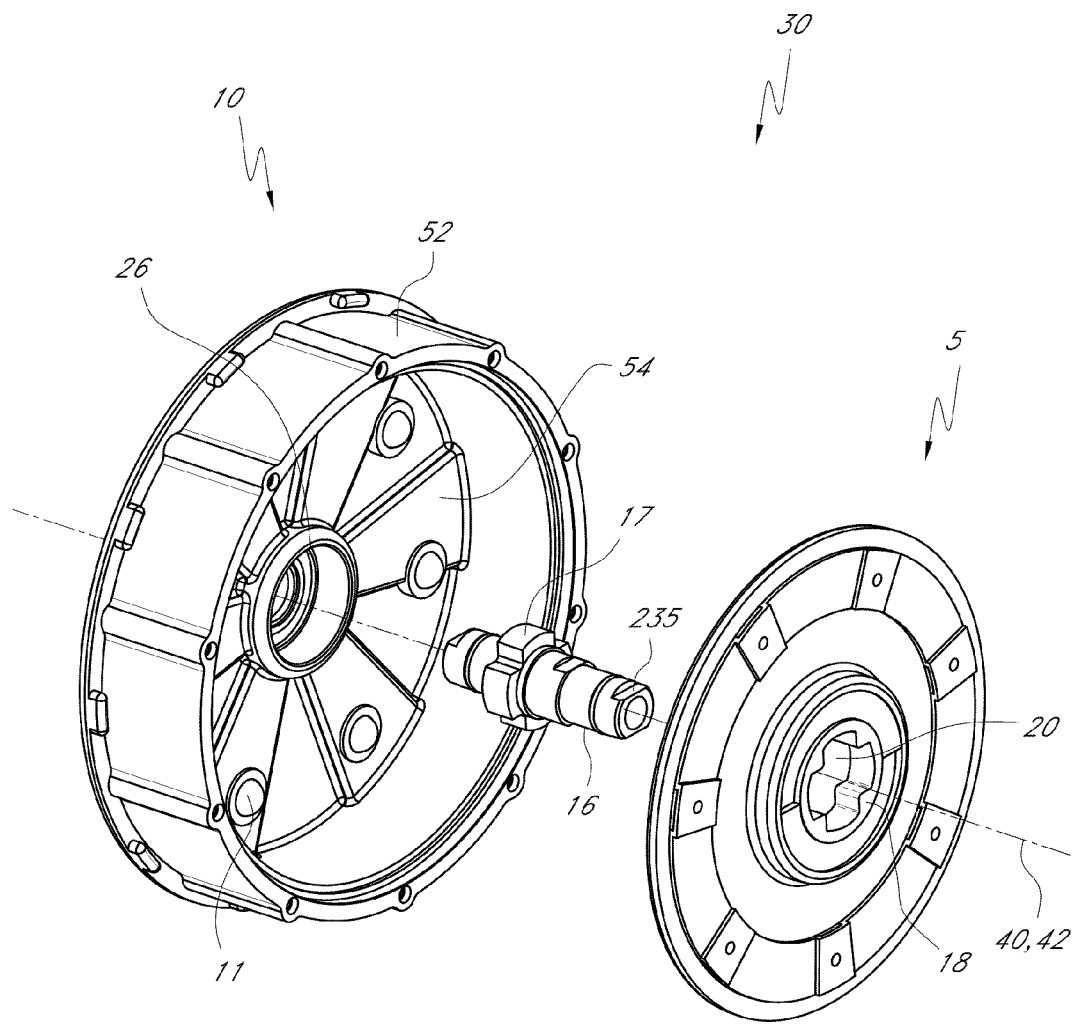
FIGS. 10A and 10B are exploded views of a brake mechanism that can be used with embodiments of the wheel shown in FIG. 9A.
Figure 10B:
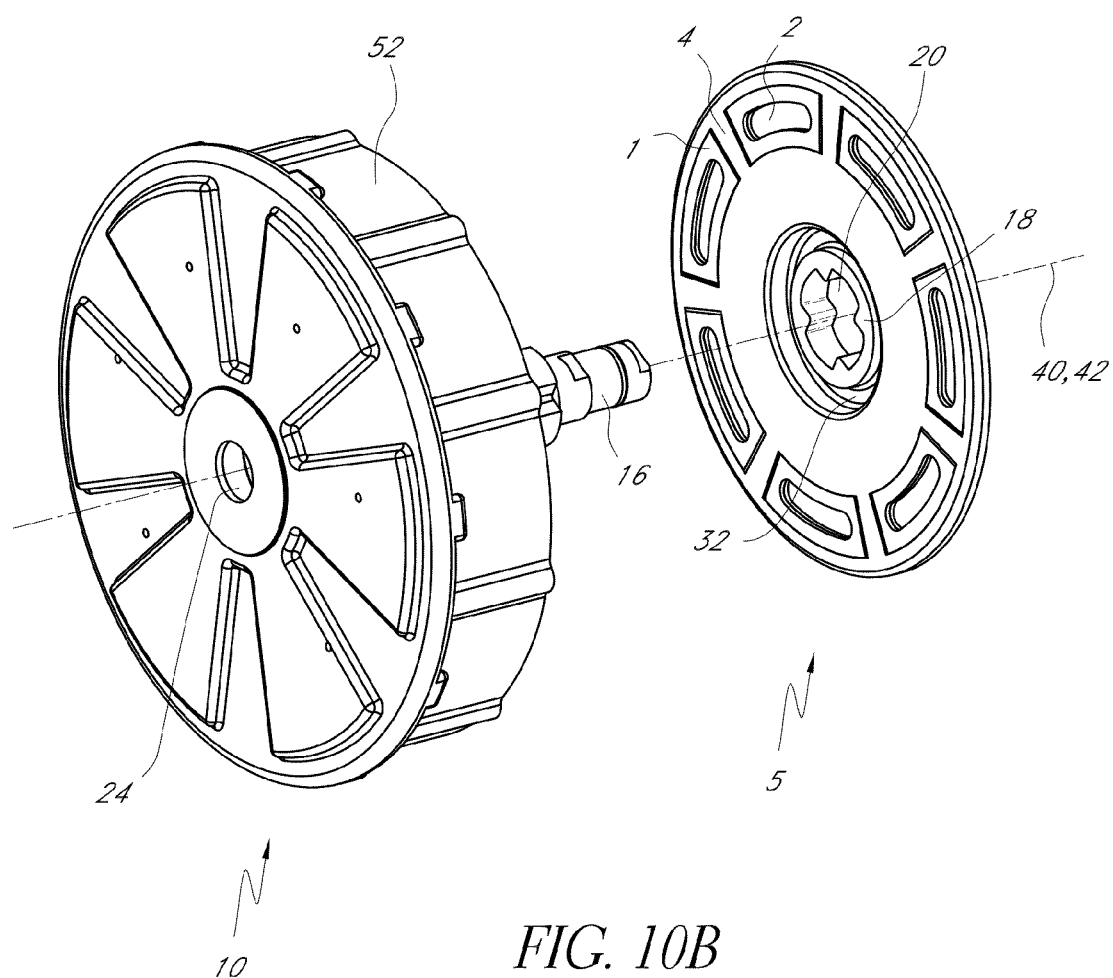

FIGS. 10A and 10B are exploded views that schematically illustrate an embodiment of a brake mechanism 30 that may be used, for example, with embodiments of the wheel 212 shown in FIG. 9A. FIG. 9B is a block diagram that schematically illustrates an embodiment of the brake mechanism 30 disposed, with other components, in the wheel 212 (discussed further below). The brake mechanism 30 comprises a brake plate assembly 5 which is axially positioned relative to a wheel hub 10 using an axle component 16. The wheel hub 10 shown in FIG. 10 can be used as the hub of the wheel 212 shown in FIG. 9A. In various embodiments, the brake plate assembly 5 and the wheel hub 10 may be generally similar to the embodiments described above. The axle component 16 (which may be used as the axle 234 shown in FIG. 9A) is an elongated member that has a longitudinal cavity to permit passage of a wheel axle (such as the bolt 228 shown in FIG.

9A) along the hub axis 40 of the wheel hub 10. When assembled, the plate axis 42 of the brake plate assembly 5 is substantially collinear with the axis 40 of the wheel hub 10. In use on a wheeled vehicle, the axes 40, 42 are substantially collinear with the rotation axis of the wheel 212.

The axle component 16 comprises a first end configured to pass through the opening 24 in the wheel hub 10 along the axis 40. The first end may be substantially circular in cross-section, which allows the wheel hub 10 to rotate around the axle component 16. The axle component 16 comprises a second end configured to pass through the opening 20 in the brake plate assembly 5. The axle component 16 may also comprise interlocking features 17 configured to engage corresponding features 18 formed in the opening 20 of the brake plate assembly 5. As shown in the example in FIG. 10, the interlocking features 17 and the corresponding features 18 are cross-shaped. The interlocking features 17 and the features 18 may be shaped differently in other embodiments. As will be further discussed below, the brake plate assembly 5 can be configured to move axially relative to the axle component 16, e.g., toward and/or away from the wheel hub 10 along the substantially collinear axes 40, 42. The axial length of the interlocking features 17 can be selected to be sufficiently large so that the features 17 interlock with the features 18 on the brake plate assembly 5 throughout the entire axial range of motion of the brake plate assembly 5.

In embodiments that utilize the interlocking features 17, 18, the brake plate assembly 5 is mechanically coupled to the axle component 16 such that relative rotational movement between the axle component 16 and the brake plate assembly 5 is substantially prevented while relative axial movement of the brake plate assembly 5 along the axle component 16 (e.g., along the axes 40, 42) is allowed. In the illustrated embodiment, the first end of the axle component 16 permits relative rotation of the wheel hub 10 and the axle component 16, while the interlocking features 17, 18 prevent relative rotational movement of the brake plate assembly 5 and the axle component 16. Therefore, in the illustrated embodiment, the wheel hub 10 is able to rotate relative to the brake plate assembly 5.

In certain embodiments, the axle component 16 is configured to remain fixed as the wheel 212 rotates. For example, the first end and/or the second end of the axle component 16 may have flat portions 235 that engage shaped holes 237 in the retaining clips 225 (see FIG. 9A). Therefore, in certain such embodiments, as the wheel 212 and the wheel hub 10 rotate, the axle component 16 remains rotationally fixed, and the brake plate assembly 5 also remains rotationally fixed due to the interlocking features 17, 18.

In certain embodiments, the brake mechanism 30 is sized and shaped to fit within the wheel 212 (e.g., within the wheel hub 10). For example, certain such embodiments are configured to fit within a standard-sized shopping cart wheel. Some such embodiments include cart wheels having a diameter of about 5 inches (about 13 cm). Other embodiments of the wheel can be larger or smaller. For example, certain medical device carts and/or baggage carts use wheels having a diameter of about 3 inches (about 8 cm) and/or a diameter of about 10 inches (about 25 cm). Embodiments of the brake mechanism 30 can be configured for use with wheels having a diameter, for example, in a range from about 2 inches (about 5 cm) to about 12 inches (about 30 cm). Other diameters are possible. In some such embodiments, the brake mechanism 30 may be sized and shaped to fit within a hub of the wheel (the hub surrounded by the tire 213). As described with reference to FIG. 9A, a cover 221 may be attached to the wheel hub 10 to protect the components of the brake mechanism 30 and/or other components in the wheel hub 10.

In various embodiments, the brake mechanism 30 and other components may be disposed in the wheel 212 (e.g., disposed within the cavity 23 of the wheel hub 10 in some cases). For example, FIG. 9B is a block diagram schematically illustrating an embodiment of the wheel 212 comprising an embodiment of the brake mechanism 30. A power system 268 provides electrical power to the brake mechanism 30, a brake controller 264, and an electromagnetic receiver 272. For example, the receiver 272 can be configured to receive (and/or transmit in some embodiments) radio frequency (RF) signals. The wheel 212 includes an antenna 276 for receiving suitable electromagnetic (e.g., RF) signals. The electromagnetic signals can be communicated to the brake controller 264 and used to actuate and/or deactuate the brake mechanism 30. The brake mechanism 30 can include a drive mechanism to actuate and/or deactuate the brake (see, e.g., FIGS. 12A-12C), thereby inhibiting movement of the vehicle. The receiver 272 can be configured to receive RF control signals that are transmitted from, for example, a very low frequency (VLF) antenna, electronic article surveillance (EAS) towers, a wireless access point (AP), RF transmitters, and combinations of such components. In some implementations, the VLF signals are transmitted at frequencies below about 9 kHz. In some implementations, the RF signals are communicated at commonly used wireless signal frequencies (e.g., 2.4 GHz). Further details are described in the Two-Way Communication Publication. In some embodiments, the receiver 272 comprises a bi-directional transceiver as described, for example, in the Two-Way Communication Publication.

The power system 268 can include power storage units that provide electrical power to components in the wheel (and/or off the wheel). The power storage units can include one or more batteries, one or more capacitors (e.g., ultracapacitors), and so forth. In some embodiments, the power system 268 includes an electrical generator that generates electrical power from rotation of the wheel 212 (described further below).

The brake controller 264 can be implemented in hardware using one or more computing devices including, but not limited to, processors, microcontrollers, application specific integrated circuits (ASICs), programmable logic devices (PLDs), and so forth. The brake controller 264 can include or be operatively associated with a memory (e.g., RAM, ROM, EEPROM, flash memory, magnetic and/or optical memory, etc.). The brake controller 264 can be configured to execute instructions (e.g., software code modules stored by the memory) to carry out the functions of the brake mechanism 30 or other functions (e.g., cart containment functions, two-way communication functions, power management and control functions, etc.). In other embodiments, the wheel 212 may include one or more additional controllers to control other components of the wheel 212. The foregoing are merely examples of the types of components that can be included in the wheel. In other embodiments, the wheel can include additional and/or different components (e.g., a wheel navigation system, GPS components, wheel vibration sensors, etc.).

Example Method of Operation

An example of how embodiments of the brake mechanism 30 operate to inhibit motion of a vehicle wheel will now be provided. In certain embodiments, the brake mechanism 30 also includes a drive mechanism (see, e.g., FIGS. 12A and 12B) configured to convert a fraction of the rotational motion of the wheel 212 to linear motion and to move the brake plate assembly 5 in an axial direction toward and/or away from the wheel hub 10 along the axes 40, 42. The drive mechanism may be adapted to move the brake plate assembly 5 in a substantially continuous motion. In other embodiments, the drive mechanism may comprise an electrically controllable motor and gear system configured to move the brake plate assembly 5 in an axial direction parallel to the axes 40, 42 (see, e.g., FIGS. 12A and 12B).

The brake mechanism 30 may include an electronic brake controller configured to control movement of the brake plate assembly 5 (see, e.g., the controller 264 described with reference to FIG. 9B). In some embodiments, the brake mechanism 30 comprises a sensor (e.g., an electromagnetic receiver) configured to receive electromagnetic signals (e.g., a boundary signal from a cart confinement application). In response to the received signals, the brake controller may adjust the brake plate assembly 5 to provide a suitable amount of braking force (as described below).

Figure 11B:
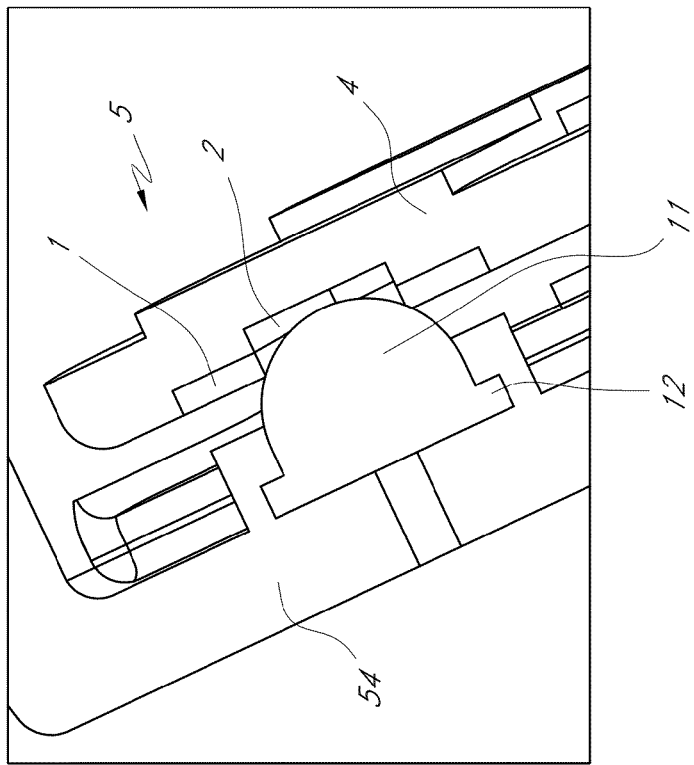
FIGS. 11A and 11B are a close-up perspective view (FIG. 11A) and a close-up section view (FIG. 11B) schematically illustrating engagement of a contact point insert in a wheel hub and a slot in a brake plate assembly during braking in an embodiment of a brake mechanism.
Figure 11A:
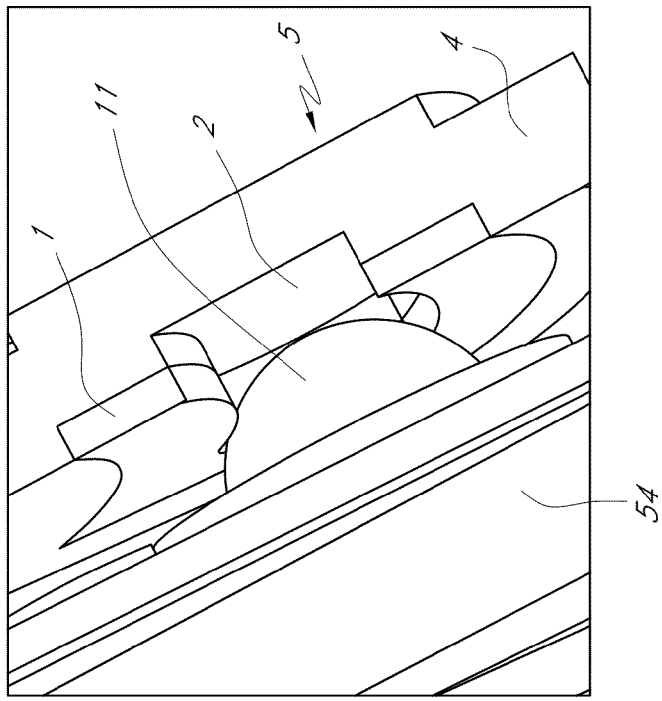

In some embodiments, when the braking function is initiated, the drive mechanism moves the brake plate assembly 5 in a continuously advancing axial direction parallel to the axes 40, 42 toward the side wall 54 in the wheel hub 10 (see the close-up views shown in FIG. 11). As described above, the wheel hub 10 rotates relative to the brake plate assembly 5. As the slots 2 of the in the brake plate assembly 5 relatively pass and/or engage the outer surface(s) of the contact point inserts 11 (or the protrusions 14 shown in the embodiment of FIG. 8), an increasing amount of braking force (or torque) in the direction opposite to the wheel rotation is produced. For example, the braking force is provided, among other possible forces, by the reaction force of the contact point inserts 11 (or the protrusions 14 shown in the embodiment of FIG. 8) in the wheel hub 10 deflecting the brake plate assembly 5 as the contact points enter and exit successive slots 2. The reaction force may also include frictional forces between the contact points and areas of the brake plate assembly 5 between the slots 2.

Accordingly, the brake mechanism 30 advantageously provides a progressive braking force whose magnitude generally depends on how closely the drive mechanism positions the brake plate assembly 5 and the side wall 54 that has the contact point inserts 11 (or protrusions 14). For example, in some embodiments, the braking force results at least in part from the deflection of the brake plate assembly 5 and the resistance to allowing escape of the contact points 11 from the slots 2 as the wheel hub 10 rotates. Also, in certain embodiments, the braking force generally increases in magnitude the deeper the contact point inserts 11 penetrate the corresponding slots 2. If the brake plate assembly 5 is moved into sufficiently close contact with the side wall 54 of the wheel hub 10, the contact point inserts 11 engage the slots 2 (and/or areas of the assembly 5 between the slots 2) with sufficient force to substantially lock the wheel 212, thereby substantially inhibiting or preventing wheel rotation.

An advantage of certain brake mechanism embodiments that provide a variable magnitude or progressive braking force is that such brake mechanisms may produce an anti-skid effect, because the initially applied braking force is sufficient to slow wheel rotation (and inhibit movement of the vehicle) but not large enough to lock the wheel (e.g., wheel rotation is substantially prevented). When the wheel is locked, the tire 213 can skid across the ground if the vehicle is pushed or dragged while the wheel is locked. Wheel skid of a locked wheel can cause flat spots to wear in the tire 213, which damages the tire 213 and may require replacement of the worn tire or the entire wheel.

To reduce the amount of braking force (or to unlock the wheel), the drive mechanism axially moves the brake plate assembly 5 away from the side wall 54 of the wheel hub 10 such that the contact points disengage from the slots 2. Accordingly, embodiments of the brake mechanism 30 advantageously may be configured to provide a variable or progressive amount of braking force to the wheel of the vehicle. In certain such embodiments, the braking force can be sufficient to substantially lock the wheel. A further advantage of some embodiments is that the braking force can be applied (or released) rapidly, because the drive mechanism can be configured to rapidly move the brake plate assembly 5 into (or out of) engagement with contact points in the wheel hub 10.

In certain embodiments, the brake mechanism 30 provides a variable braking force between 0 (no braking force) up to an upper amount (e.g., when the wheel is locked and the wheel skids relative to the surface). For a wheel skidding over a surface, the braking force acting on the vehicle is approximately $\mu$ N, where $\mu$ is the friction coefficient between the wheel and the surface and N is the normal force of the wheel relative to the surface. For example, the friction coefficient $\mu$ of rubber on dry concrete is about 0.7. In an illustrative example, the upper amount of braking force for a four-wheeled shopping cart weighing about 290 pounds (about 1290 Newtons) and having one locked wheel is about 50 pounds (about 220 Newtons). In some embodiments, the variable braking force produced by some embodiments of the brake mechanism 30 can cause a shopping cart travelling at a typical walking speed of about 4.4 feet/sec (about 1.3 m/s) to stop in a distance of about 6 feet (about 1.8 m). Other values of braking forces and stopping distances are provided by other embodiments of the brake mechanism 30.

Figure 7:
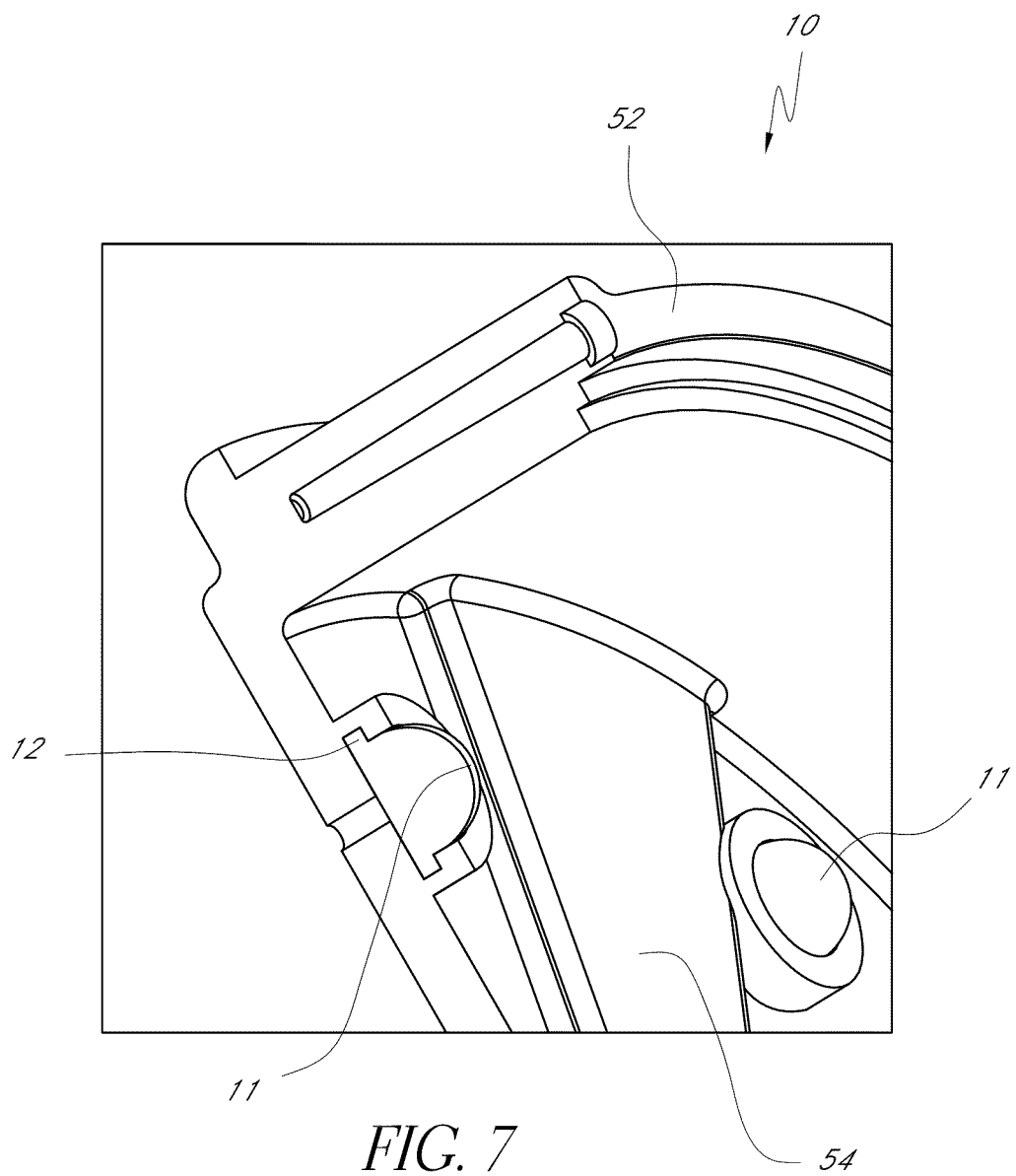
FIG. 7 is a perspective view of a portion of the wheel hub shown in FIG. 5.

Although this example method of operation has been described with particular reference to embodiments of the brake plate assembly 5 described with reference to FIGS. 1-3 and the wheel hub 10 described with reference to FIGS. 5-7, embodiments of the brake mechanism 30 comprising alternative embodiments of the brake plate assembly 5 (e.g., as described with reference to FIG. 4) and the wheel hub 10 (e.g., as described with reference to FIG. 8) will provide a braking force substantially as described above. Additionally, in certain alternative embodiments, the brake plate assembly 5 is configured to comprise the contact point inserts 11 (and/or protrusions 14), and the wheel hub 10 is configured to comprise the slots 2 (and/or the slots 7). In other embodiments, the brake plate assembly 5 and the wheel hub 10 comprise both slots and contact point inserts/protrusions. Many variations and combinations are possible.

Example Brake Plate Assembly Drive Mechanism

Figure 12A:
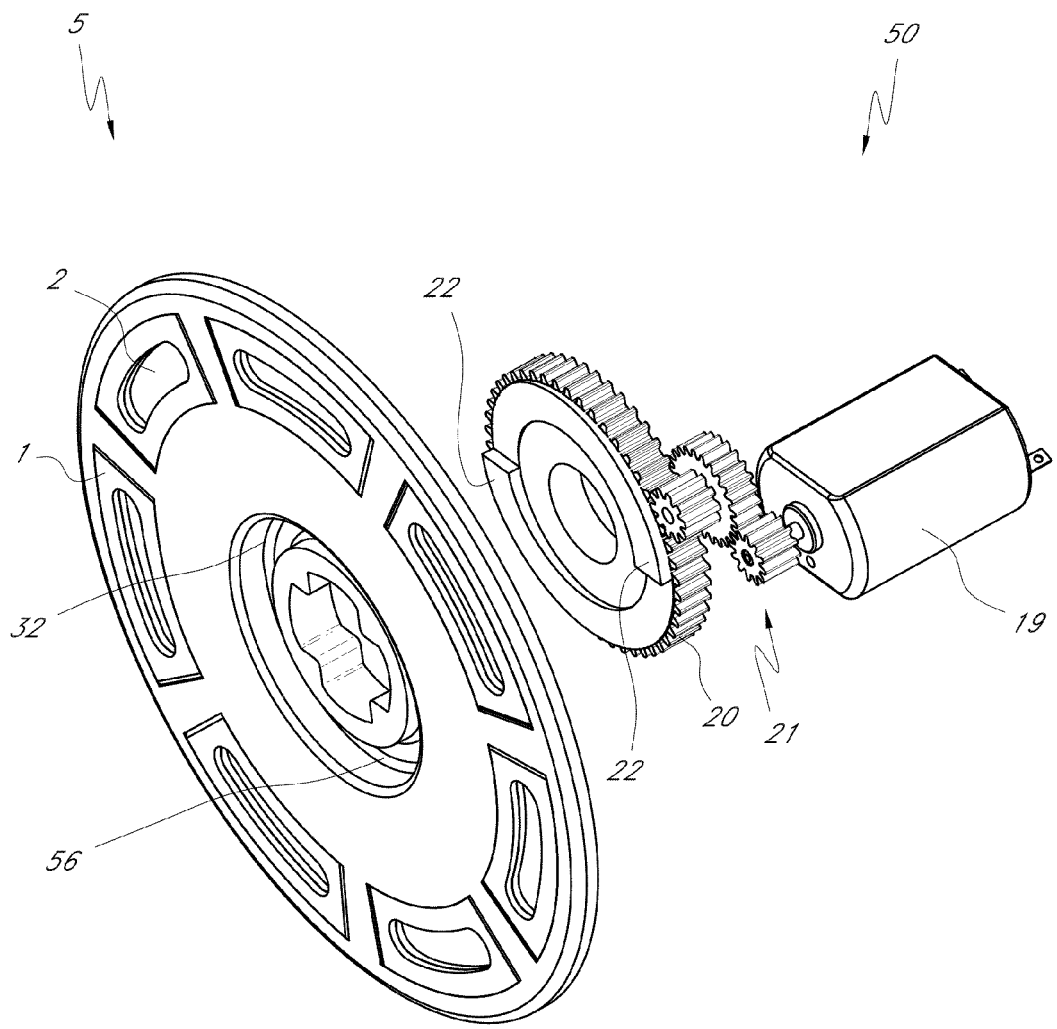
FIGS. 12A and 12B are exploded views that schematically illustrate an embodiment of a drive mechanism for a brake.
Figure 12B:
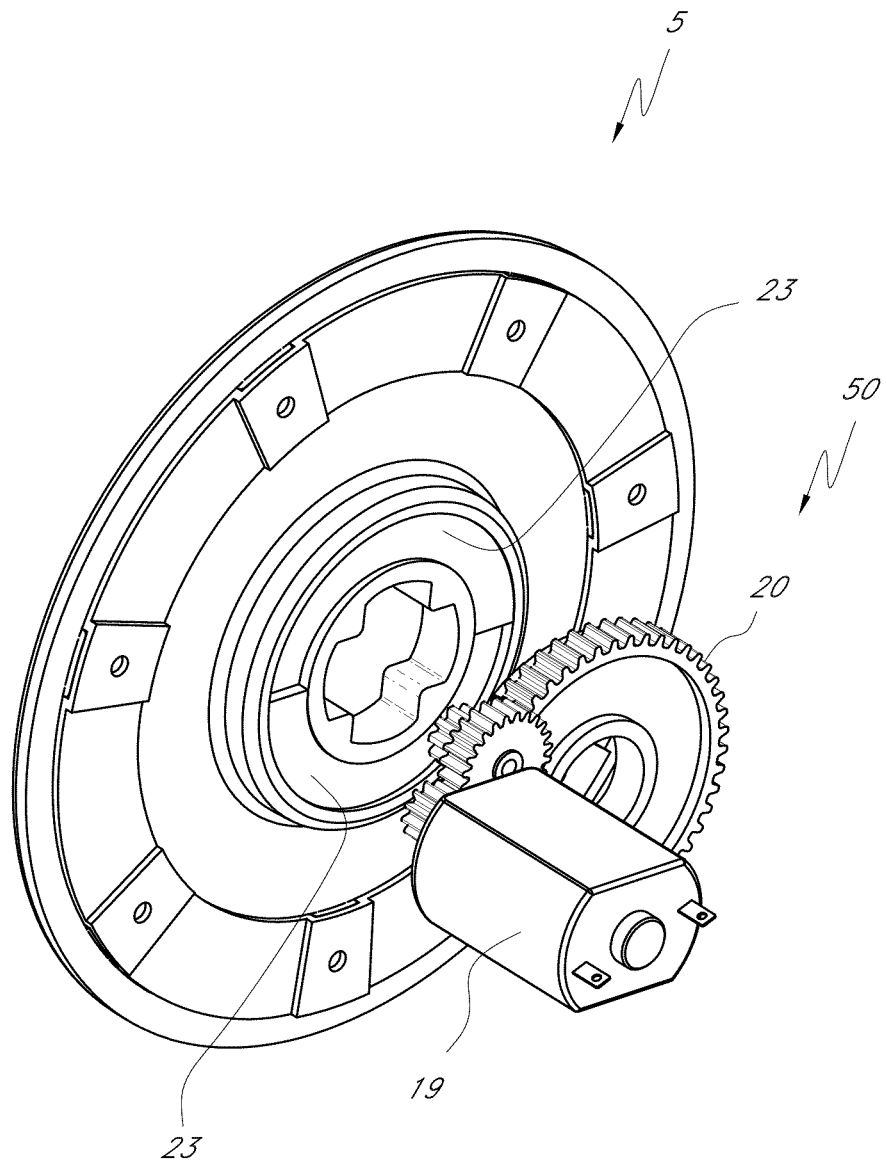

In certain embodiments, a drive mechanism 50 is used to actuate and/or deactuate the wheel brake. FIGS. 12A and 12B are exploded views that schematically illustrate an embodiment of the drive mechanism 50 that comprises a motor 19, a drive gear 20, and spur gears 21. In certain embodiments, the drive mechanism 50 is configured to be disposed in the wheel hub 10 in order that the brake mechanism is fully contained within the wheel 212. Certain such embodiments advantageously allow the wheel 212 to readily replace an ordinary (e.g., non-braking) wheel on a vehicle and also allow for easy replacement if the wheel 212 (or an internal component of the wheel 212) malfunctions. Further, the wheel 212 can be manufactured to look similar to ordinary (e.g., non-braking) wheels, or other wheels on the vehicle, which makes it more difficult for users of the vehicle to suspect that one (or more) wheels contain a brake mechanism. Such a wheel design advantageously may reduce the likelihood of tampering or disabling the wheel brake mechanism. In implementations suitable for many retail markets, the brake mechanism (and the drive mechanism) can be configured to be disposed within a widely-used 5 inch (12.7 cm) diameter wheel.

In the illustrated embodiment, the drive mechanism 50 moves the brake plate assembly 5 in a substantially continuous axial direction toward and/or away from the contact point inserts 11 in the wheel hub 10 (not shown). The drive gear 20 is mounted on the cylindrical portion of the axle component 16 (see, e.g., FIG. 10A) and is free to rotate but is constrained axially. The motor 19 is mechanically coupled to the drive gear 20 with one or more spur gears 21. The motor 19 may comprise an electric motor such as, e.g., a direct current (DC) electric motor. The motor 19 can receive electrical power from the power system 268 shown in FIG. 9B.

Figure 12C:
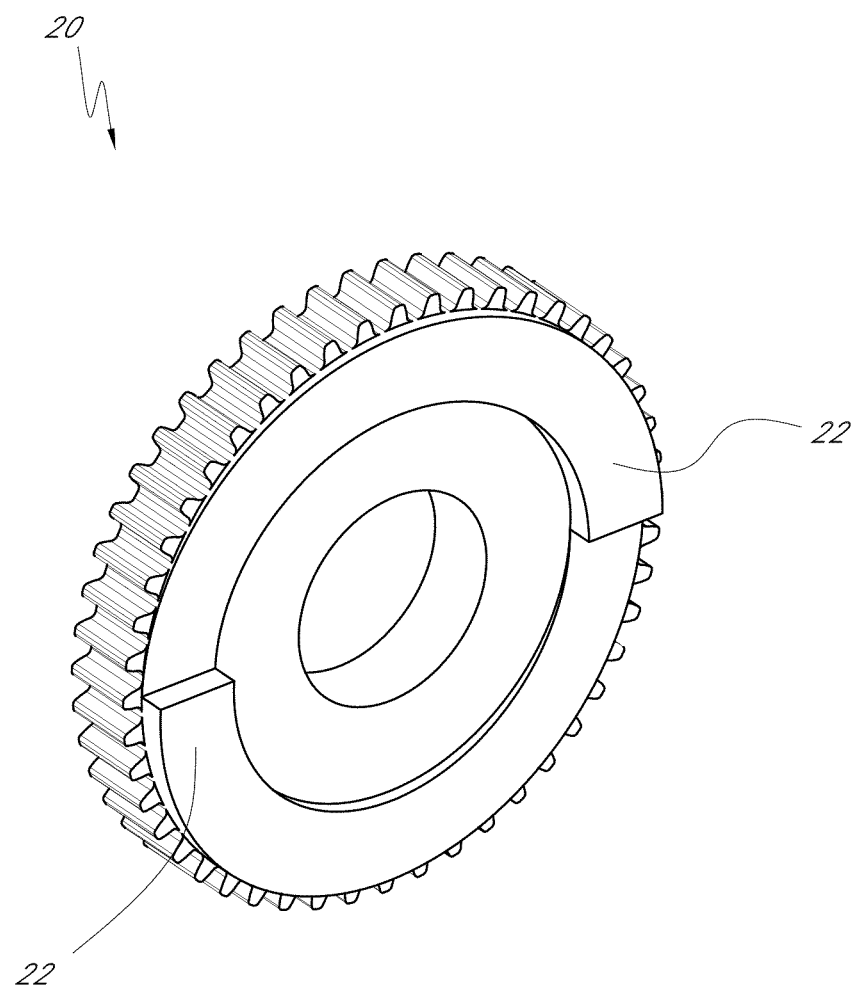
FIG. 12C is a perspective view that schematically illustrates an embodiment of a drive gear.

FIG. 12C schematically illustrates an embodiment of the drive gear 20. In this embodiment, two radial protrusions 22 are disposed 180 degrees apart on the face of the drive gear 20 that adjoins the brake plate assembly 5. Each of the protrusions 22 forms a ramp or helix that is continuously increasing in height above the face of the drive gear 20. The adjoining side of the brake plate assembly 5 has two mating features 23 (see, e.g., FIG. 12B) molded into the surface and which are configured to engage the protrusions 22. In other embodiments, a different number and/or configuration of protrusions 22 and mating features 23 may be used. For example, a single arcuate ramp or helix can be used as the protrusion 22 in some embodiments.

In the embodiment illustrated in FIGS. 12A and 12B, the motor 19 is mounted in a fixed position in the wheel chassis. The motor 19 is electrically connected to an energy source such as a battery (e.g., a 3 V battery, not shown) and/or an ultracapacitor and to an electronic control system (not shown) for controlling the drive mechanism 50. For example, in certain embodiments, the control system may include an antenna and receiver for detecting radio-frequency (RF) signals communicated to the control system by a cart containment system (see, e.g., FIG. 9B). For example, the external source can include an embedded boundary wire that transmits a VLF signal, a wireless access point, and/or an RF transmitter or transceiver that transmits the RF signal to provide a signal to actuate (and/or deactuate) the brake mechanism. Further examples of a cart containment system and associated hardware, circuitry, and wheel components are shown and described in the Two-Way Communication Publication.

In some embodiments, the control system is responsive to a lock signal and an unlock signal. When the control system receives the lock signal, the motor 19 is commanded to rotate, thereby turning the spur gears 21. The spur gears 21 may be sized (and/or have suitable gear ratios) so as to provide a suitable speed reduction (if desired) from the drive speed of the motor 19. Rotation of the spur gears 21 rotates the drive gear 20. In the illustrated embodiment, the radial protrusions 22 on the drive gear 20 and the mating features 23 on the surface of the brake plate assembly 5 are initially nested together. Since the brake plate assembly 5 is constrained to move in the axial direction (e.g., due to the interlocking features 17, 18 shown in FIG. 10), and the drive gear 20 is constrained to rotate (and not move axially), as the drive gear 20 rotates, the ramp-shaped protrusions 22 and the mating features 23 are forced to separate. In response, the brake plate assembly 5 moves axially toward, and into contact with, the contact point inserts 11 in the hub 10. The configuration of the protrusions 22 and mating features 23 (e.g., ramp height, ramp angle, etc.) may be selected to provide a desired range of axial motion for the brake plate assembly 5. As described above, the braking force generally increases (decreases) in magnitude as the brake plate assembly 5 is moved toward (away from) contact with the contact point inserts 11.

When the control system receives the unlock signal, the motor 19 is commanded to rotate in the reverse direction. As the protrusions 22 rotate in the reverse direction, the mating features 23 nest together, and the brake plate assembly 5 moves away from the contact point inserts 11 on the hub 10, thereby reducing the braking force. In some embodiments, a spring (e.g., a coil spring) is configured to exert an axial force tending to urge (and/or keep) the brake plate assembly 5 in contact with the drive gear 20. In the embodiment of the drive mechanism 50 shown in FIG. 12A, one end of the coil spring (not shown) is positioned to engage a region 56 of the brake plate assembly 5 (e.g., the annular groove 32), and the other end of the coil spring engages a region of the side wall 54 (e.g., the ridge 26).

In some embodiments, the brake controller is responsive to additional and/or different braking signals. For example, in one implementation, besides the lock and unlock signals, the controller is responsive to a partial brake signal in which the brake is activated to provide sufficient braking force to inhibit rotation of the wheel but insufficient force to lock the wheel. The partial brake signal may provide an advantage wherein the partially braked wheel will not skid against a surface (e.g., concrete), thereby reducing wear of the tire 213. In other embodiments, progressive braking signals may be provided so that the brake mechanism can provide a desired amount of progressive braking force (or torque).

In other embodiments of the drive mechanism 50, components can be rearranged and/or configured differently. Components can be added, substituted, and/or removed. For example, in some embodiments, a friction clutch is used to communicate the drive force to move the brake assembly 5. The clutch can include a clutch plate having protrusions generally similar to the protrusions 22 on the drive plate 20. The protrusions on the clutch plate engage the mating features 23 on the brake plate assembly 5. When the clutch is actuated, rotation of the clutch plate having the protrusions causes the brake plate assembly 5 to move toward the wheel hub 10 and insert points 11. The clutch can be configured to slip when the braking force (or torque) reaches a desired maximum level. When the clutch is released, a spring can be used to urge the brake plate assembly away from the wheel hub 10 and inserts 11, thereby decreasing the braking force. In some such embodiments, the clutch can be actuated (deactuated) using an electric motor to move the clutch plates into (out of) frictional engagement.

In some embodiments, rotation of the wheel, via suitable gearing, can be used to provide the mechanical force to drive the brake plate assembly 5 when the friction clutch is actuated. For example, in some such embodiments, a toothed drive gear ring is attached to or formed on the wheel hub. The drive gear ring rotates with the wheel and, through suitable gearing, drives the drive gear 20 for moving the brake plate assembly 5. Such embodiments advantageously use the mechanical energy of wheel rotation to actuate and/or deactuate the brake mechanism, instead of (or in addition to) the electrical energy of the motor 19. Further, in some such embodiments, the drive gear ring can, through suitable gearing, drive an electrical generator which can provide power to components in the wheel (or the vehicle) and/or to power storage units (e.g., batteries and/or ultracapacitors). Some such embodiments may provide advantages such as reduced electrical power consumption from a power storage unit (e.g., a battery and/or a capacitor), because wheel rotational energy is used to power the brake mechanism and the power storage unit can be used to power electrical components (e.g., controllers) that require less power to operate than the brake mechanism.

In some embodiments, the drive mechanism 50 comprises a solenoid that, when activated, brings a set of gears into or out of contact with the drive gear 20 and the toothed drive gear ring. Such engagement of the drive gear 20 and the toothed drive gear ring allows rotation of the wheel to turn the drive gear 20 and thereby to produce the axial movement of the brake plate assembly 6 toward and/or away from engagement with engagement features (if any) on the side wall of the wheel hub 10. In some such embodiments, the solenoid can be powered by the power system 268 schematically shown in FIG. 9B. For example, one or more batteries and/or capacitors can be used. In some implementations, the power system 268 comprises a wheel power generator to charge the batteries and/or the capacitors.

Embodiments of a wheel comprising a drive gear ring capable of driving a wheel power generator and/or embodiments of the drive mechanism 50 described herein are shown and described in U.S. Patent Application Publication 2006/024932, entitled "Power Generation Systems and Methods for Wheeled Objects," published Nov. 9, 2006 (hereinafter "the Wheel Power Generator Publication"), the entire disclosure of which is hereby expressly incorporated by reference herein and made part of this specification. The Wheel Power Generator Publication also shows and describes examples of other hardware, components, and circuitry that can be included in the wheel including, but not limited to, a wheel power generator and electrical storage units that can be used to at least partially power the drive mechanism 50 (and/or other electrical components) of certain embodiments of the brake mechanism 30. The Power Generator Publication also shows and describes power management and control systems that can be used with embodiments of the brake mechanism described herein. In some embodiments, the power management and control system is implemented by the brake controller 264 or by another controller or processor (which may be included in the wheel).

Although described in the illustrative context of certain preferred embodiments and examples, the disclosure extends beyond the specifically described embodiments to other alternative embodiments and/or uses and obvious modifications and equivalents. For example, in certain embodiments, the brake plate assembly 5 does not include the arcuate slots 2 and the wheel hub 10 does not include the contact point inserts 11. Certain such embodiments provide a braking force on a rotating wheel by moving the brake plate assembly 5 into frictional engagement with the side wall 54 of the wheel hub. The friction between the surface of the brake plate assembly 5 and the surface of the side wall 54 opposes rotation of the wheel and provides a braking force (or torque). In some such embodiments, the surface of the brake plate assembly 5 and/ or the surface of the side wall 54 may include a frictional material (e.g., a brake pad) to increase the frictional coupling between these surfaces.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claimed invention require more features than are expressly recited in that claim. Rather, inventive aspects lie in a combination of fewer than all features of any single foregoing disclosed embodiment. For example, the embodiments described herein may have several features, no single one of which is indispensable or solely responsible for their desirable attributes.

Reference throughout this application to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular components, features, structures, characteristics, steps, or acts may be combined, rearranged, or reordered in any suitable manner, as would be apparent to one of ordinary skill in the art from this disclosure, in one or more embodiments. Components, features, structures, steps, or acts can be added or removed from the illustrated embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed is:

1. A brake assembly for a wheel of a non-motorized wheeled vehicle, the brake assembly comprising:
    a wheel hub comprising a side wall, the wheel hub having a hub axis that is substantially perpendicular to the side wall, the side wall comprising a plurality of first engagement features spaced transversely from the hub axis;
    a brake plate having a plate axis that is substantially perpendicular to the brake plate, the brake plate comprising a plurality of second engagement features spaced transversely from the plate axis;
    an axle that couples the brake plate to the wheel hub such that the plate axis is substantially collinear with the hub axis, the axle configured to allow relative rotation between the wheel hub and the brake plate, the brake plate axially movable relative to the axle between a first position and a second position, the first position spaced a first distance along the hub axis from the side wall and the second position spaced a second distance along the hub axis from the side wall, the second distance less than the first distance;
    a drive mechanism configured to move the brake plate between the first position and the second position, the drive mechanism comprising a rotatable drive gear, the drive gear comprising a drive feature configured to mate with a complementary drive feature on the brake plate such that rotation of the drive gear in a first direction causes the brake plate to move from the first position to the second position and rotation of the drive gear in a second direction opposite to the first direction causes the brake plate to move from the second position to the first position; and
    a spring configured to urge the brake plate into engagement with the drive gear such that the drive feature of the drive gear mates with the corresponding drive feature of the brake plate,
    wherein the plurality of second engagement features are configured to engage the plurality of first engagement features when the brake plate is in the second position but not when the brake plate is in the first position.

2. The brake assembly of claim 1, wherein at least one of the plurality of first engagement features comprises a protrusion and at least one of the plurality of second engagement features comprises a slot.

3. The brake assembly of claim 1, wherein at least one of the plurality of first engagement features comprises a slot and at least one of the plurality of second engagement features comprises a protrusion.

4. The brake assembly of claim 1, wherein the brake plate comprises a disc and one or more inserts coupled to the disc, the disc formed from a polymer and the one or more inserts formed from a metal, wherein at least one of the plurality of second engagement features is formed in at least one of the one or more inserts.

5. The brake assembly of claim 1, wherein the wheel hub comprises one or more inserts coupled to the side wall and at least one of the plurality of first engagement features is formed in at least one of the one or more inserts.

6. The brake assembly of claim 1, wherein the wheel hub is configured to rotate as the wheel rotates and the brake plate is configured not to rotate as the wheel rotates.

7. The brake assembly of claim 1, wherein the brake plate comprises a first retaining feature, the side wall of the wheel hub comprises a second retaining feature configured to engage the first retaining feature, wherein engagement of the first retaining feature and the second retaining feature permit relative rotation of the wheel hub and the brake plate.

8. The brake assembly of claim 7, wherein the first retaining feature comprises an annular groove and the second retaining feature comprises an annular ridge or the first retaining feature comprises an annular ridge and the second retaining feature comprises an annular groove.

9. The brake assembly of claim 1, wherein the axle comprises a first portion and a second portion, the first portion configured to engage the wheel hub and the second portion configured to engage the brake plate, the first portion configured to allow the wheel hub to rotate relative to the axle and the second portion configured to inhibit the brake plate from rotating relative to the axle.

10. The brake assembly of claim 1, wherein the drive feature on the drive gear and the corresponding drive feature on the brake plate comprise one or more arcuate ramps.

11. The brake assembly of claim 1, wherein the drive mechanism further comprises an electric motor configured to rotate the drive gear in the first direction and the second direction.

12. The brake assembly of claim 1, further comprising an electromagnetic receiver configured to receive one or more control signals, wherein the drive mechanism is configured to move the brake plate from the first position to the second position or from the second position to the first position in response to a received control signal.

13. The brake assembly of claim 12, wherein the drive mechanism is configured to move the brake plate from the first position to the second position in response to a lock signal and to move the brake plate from the second position to the first position in response to an unlock signal.

14. The brake assembly of claim 1, wherein the wheel hub further comprises a tire engagement surface configured to accept a tire.

15. The brake assembly of claim 1, wherein the brake assembly is configured for use with a shopping cart wheel.

16. A method of inhibiting movement of a non-motorized wheeled vehicle, the method comprising:
providing a wheel comprising the brake assembly of claim 1; and
moving the brake plate of the brake assembly from the first position to the second position.

17. The method of claim 16 further comprising moving the brake plate of the brake assembly from the second position to the first position.

18. The method of claim 16, wherein the brake assembly further comprises an electromagnetic receiver configured to receive one or more control signals, the drive mechanism configured to move the brake plate from the first position to the second position or from the second position to the first position in response to a received control signal, the method further comprising:
receiving at least one control signal and moving the brake plate from the first position to the second position or from the second position to the first position in response to the at least one control signal.

19. A wheel for a human-propelled wheeled cart, the wheel rotatable about a wheel rotation axis, the wheel comprising:
a wheel hub comprising a cavity and a tire engagement surface configured to accept a tire; and
a brake configured to inhibit rotation of the wheel about the wheel rotation axis, the brake disposed in the wheel hub of the human-propelled wheeled cart, the brake comprising:
an engagement surface configured to rotate about the wheel rotation axis when the wheel rotates, the engagement surface disposed within the cavity of the wheel hub;
a brake surface configured not to rotate about the wheel rotation axis when the wheel rotates, the brake surface movable toward and away from the engagement surface in a direction substantially parallel to the wheel rotation axis; and
a brake actuator disposed within the cavity of the wheel hub, the brake actuator configured to move the brake surface between a first position and a second position relative to the engagement surface along the direction, the brake surface disposed within the cavity of the wheel hub when in the first position and when in the second position, wherein when the brake surface is in the first position the engagement surface and the brake surface are not in contact, and when the brake surface is in the second position at least a portion of the engagement surface and the brake surface are in contact, thereby inhibiting rotation of the wheel, the brake actuator comprising a rotatable drive gear such that rotation of the drive gear in a first direction causes the brake surface to move from the first position to the second position and rotation of the drive gear in a second direction opposite to the first direction causes the brake surface to move from the second position to the first position,
wherein the engagement surface comprises a plurality of first features spaced transversely from the wheel rotation axis, and the brake surface comprises a plurality of second features spaced transversely from the wheel rotation axis, at least one of the plurality of first features configured to engage at least one of the plurality of second features when the brake surface is in the second position.

20. The wheel of claim 19, wherein a frictional material is disposed on at least a portion of the engagement surface, on at least a portion of the brake surface, or on at least portions of both the engagement surface and the brake surface.

21. The wheel of claim 19, wherein at least one of the plurality of first features comprises a protrusion and at least one of the plurality of second features comprises a slot or at least one of the plurality of first features comprises a slot and at least one of the plurality of second features comprises a protrusion.

22. The wheel of claim 19, further comprising an electromagnetic receiver configured to receive one or more control signals, the receiver configured to communicate with the brake actuator, the brake actuator configured to move the brake surface from the first position to the second position or from the second position to the first position in response to a received control signal.

23. The wheel of claim 22, wherein the brake actuator is configured to move the brake surface from the first position to the second position in response to a lock signal and to move the brake surface from the second position to the first position in response to an unlock signal.

24. The wheel of claim 19, wherein when the brake surface is in the second position, the wheel is not in a locked state in which rotation of the wheel is substantially prevented.

25. The wheel of claim 19, wherein the human-propelled wheeled cart comprises a shopping cart.

26. The wheel of claim 19, wherein the wheel has a diameter in a range from about 3 inches to about 10 inches.

27. A human-propelled wheeled cart comprising the wheel of claim 19.

28. The wheel of claim 19, further comprising a tire attached to the tire engagement surface of the wheel hub.

29. A brake assembly for a wheel of a non-motorized wheeled vehicle, the brake assembly comprising:
- a wheel hub comprising a side wall, the wheel hub having a hub axis that is substantially perpendicular to the side wall, the side wall comprising a plurality of first engagement features spaced transversely from the hub axis;
- a brake plate having a plate axis that is substantially perpendicular to the brake plate, the brake plate comprising a plurality of second engagement features spaced transversely from the plate axis,
- wherein the brake plate comprises a disc and one or more inserts coupled to the disc, the disc formed from a polymer and the one or more inserts formed from a metal, wherein at least one of the plurality of second engagement features is formed in at least one of the one or more inserts;
- an axle that couples the brake plate to the wheel hub such that the plate axis is substantially collinear with the hub axis, the axle configured to allow relative rotation between the wheel hub and the brake plate, the brake plate axially movable relative to the axle between a first position and a second position, the first position spaced a first distance along the hub axis from the side wall and the second position spaced a second distance along the hub axis from the side wall, the second distance less than the first distance; and
- a drive mechanism configured to move the brake plate between the first position and the second position, the drive mechanism comprising a rotatable drive gear, the drive gear comprising a drive feature configured to mate with a complementary drive feature on the brake plate such that rotation of the drive gear in a first direction causes the brake plate to move from the first position to the second position and rotation of the drive gear in a second direction opposite to the first direction causes the brake plate to move from the second position to the first position,
- wherein the plurality of second engagement features are configured to engage the plurality of first engagement features when the brake plate is in the second position but not when the brake plate is in the first position.

30. The brake assembly of claim 29, wherein at least one of the plurality of first engagement features comprises a protrusion and at least one of the plurality of second engagement features comprises a slot, or at least one of the plurality of first engagement features comprises a slot and at least one of the plurality of second engagement features comprises a protrusion.

31. The brake assembly of claim 29, wherein the wheel hub is configured to rotate as the wheel rotates and the brake plate is configured not to rotate as the wheel rotates.

32. The brake assembly of claim 29, further comprising an electromagnetic receiver configured to receive one or more control signals, wherein the drive mechanism is configured to move the brake plate from the first position to the second position or from the second position to the first position in response to a received control signal.

33. The brake assembly of claim 32, wherein the drive mechanism is configured to move the brake plate from the first position to the second position in response to a lock signal and to move the brake plate from the second position to the first position in response to an unlock signal.

* * * * *